US012626600B2

(12) United States Patent　　(10) Patent No.:　US 12,626,600 B2
Obraczka et al.　　(45) Date of Patent:　　May 12, 2026

(54) SYSTEM AND METHOD FOR AUTONOMOUSLY MANEUVERING VEHICLE NODES IN A PLATOON

(71) Applicant: The Regents of the University of California, Oakland, CA (US)

(72) Inventors: Katia Obraczka, Santa Cruz, CA (US); Shesha Sreenivasamurthy, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 134 days.

(21) Appl. No.: 18/306,149

(22) Filed: Apr. 24, 2023

(65) Prior Publication Data

US 2023/0343223 A1　　Oct. 26, 2023

Related U.S. Application Data

(60) Provisional application No. 63/333,869, filed on Apr. 22, 2022.

(51) Int. Cl.
　G08G 1/00　　　(2006.01)
　G05D 1/00　　　(2006.01)
(52) U.S. Cl.
　CPC ............ G08G 1/22 (2013.01); G05D 1/0088 (2013.01); G05D 1/0295 (2013.01)
(58) Field of Classification Search
　None
　See application file for complete search history.

(56) References Cited

U.S. PATENT DOCUMENTS

| | | | | |
|---|---|---|---|---|
| 10,906,544 | B2 * | 2/2021 | Kuszmaul | ......... B60W 40/1005 |
| 11,164,463 | B2 * | 11/2021 | Szymczak | .............. B60T 17/22 |
| 11,501,646 | B2 * | 11/2022 | Kumar | .................... H04W 4/46 |
| 11,747,827 | B2 * | 9/2023 | Xu | ........................ G08G 1/0133 |
| | | | | 701/482 |
| 11,919,516 | B2 * | 3/2024 | Switkes | ............. B60W 30/162 |
| 2007/0117525 | A1 * | 5/2007 | Osafune | ................... G08G 1/20 |
| | | | | 340/901 |
| 2011/0246052 | A1 * | 10/2011 | Zaitsu | ............. G08G 1/096716 |
| | | | | 701/118 |
| 2017/0080939 | A1 * | 3/2017 | Raghu | ................... B60W 30/16 |
| 2017/0242443 | A1 * | 8/2017 | Schuh | .................... G08G 1/163 |
| 2018/0188745 | A1 * | 7/2018 | Pilkington | .............. G08G 1/22 |

(Continued)

*Primary Examiner* — Rachid Bendidi
*Assistant Examiner* — Nada Mahyoob Alqaderi
(74) *Attorney, Agent, or Firm* — Wolter Van Dyke Davis, PLLC; Eugene J. Molinelli; Michael W. Taylor

(57)　　　　　ABSTRACT

Techniques are provided for autonomously maneuvering vehicle nodes in a platoon. The method includes receiving a value of a position at a first time increment of a second vehicle node. The method further includes determining a value of a first parameter based on the first data. The method further includes receiving, at the first vehicle node, a value of the position of the second vehicle node at a second time increment. The method further includes determining a value of a second parameter based on the second data. The method further includes determining a value of a third parameter based on the value of the first parameter and the value of the second parameter. The method further includes comparing the value of the third parameter with a threshold value for the third parameter and controlling a value of a speed of the first vehicle node.

6 Claims, 21 Drawing Sheets

(56)  References Cited

U.S. PATENT DOCUMENTS

| | | | |
|---|---|---|---|
| 2018/0253976 A1* | 9/2018 | Inam | G08G 1/22 |
| 2019/0025857 A1* | 1/2019 | Luckevich | G05D 1/644 |
| 2019/0044728 A1* | 2/2019 | Karmoose | H04L 9/30 |
| 2019/0162844 A1* | 5/2019 | Tachibana | B60W 30/165 |
| 2019/0259286 A1* | 8/2019 | Kim | G08G 1/22 |
| 2019/0286120 A1* | 9/2019 | Stenneth | G05D 1/0297 |
| 2019/0294180 A1* | 9/2019 | Reinhart | B60W 30/165 |
| 2020/0033887 A1* | 1/2020 | Kim | H04W 12/10 |
| 2020/0090521 A1* | 3/2020 | Kim | H04W 4/46 |
| 2020/0324768 A1* | 10/2020 | Switkes | G08G 1/22 |
| 2021/0129836 A1* | 5/2021 | Nguyen | B60W 50/0097 |
| 2021/0213948 A1* | 7/2021 | Lahti | B60W 30/162 |
| 2021/0399415 A1* | 12/2021 | Zhang | H04W 52/241 |
| 2022/0080968 A1* | 3/2022 | Zhu | B60W 30/18163 |
| 2022/0139229 A1* | 5/2022 | Hong | G08G 1/22 |
| | | | 701/26 |
| 2022/0177002 A1* | 6/2022 | Howard | B60W 40/06 |
| 2022/0262257 A1* | 8/2022 | Franchi | G08G 1/22 |
| 2022/0351625 A1* | 11/2022 | Qi | B60W 30/165 |
| 2023/0073287 A1* | 3/2023 | Iba | B60W 30/188 |
| 2024/0094741 A1* | 3/2024 | Laws | B60W 10/04 |

\* cited by examiner

VEHICLE NODE 100

POSITIONING SENSOR 122

MOBILE TERMINAL 124

PLATOONINNG MODULE 150

SUPPORT 120

MOBILITY COMPONENT 110

PLATOON 180

COMMUNICATION RANGE 184

PATH 102a

FREEWAY 192

MAP COORDINATES 190

N     N-1     ...     3     2     1

PLATOON 180

100e

100f

100g

100h

COMMUNICATION
RANGE 184

PATH 102a

FREEWAY 192

MAP
COORDINATES
190

PLATOON 180

PATH 102a

FREEWAY 192

MAP
COORDINATES
190

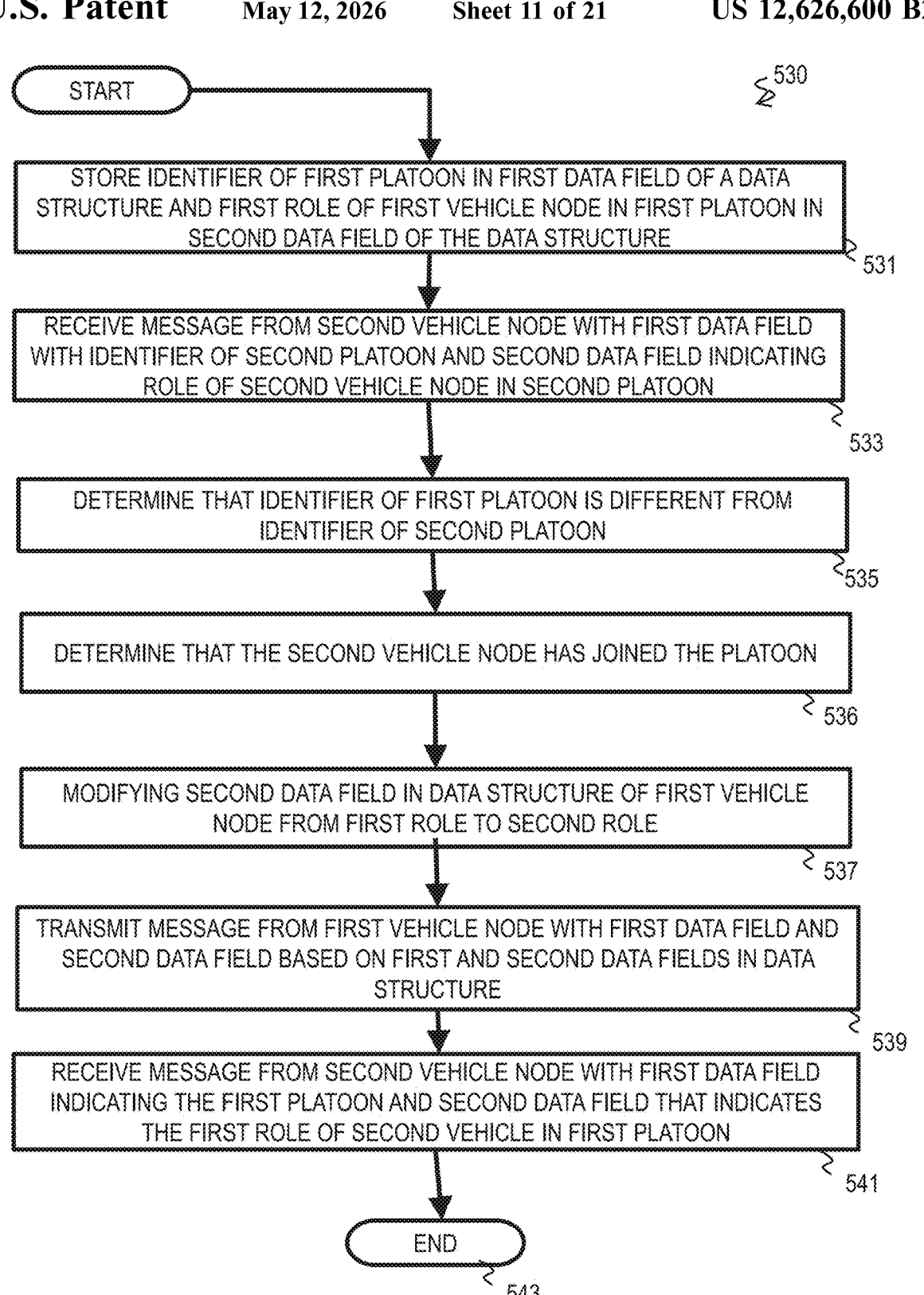

530

START

STORE IDENTIFIER OF FIRST PLATOON IN FIRST DATA FIELD OF A DATA STRUCTURE AND FIRST ROLE OF FIRST VEHICLE NODE IN FIRST PLATOON IN SECOND DATA FIELD OF THE DATA STRUCTURE

531

RECEIVE MESSAGE FROM SECOND VEHICLE NODE WITH FIRST DATA FIELD WITH IDENTIFIER OF SECOND PLATOON AND SECOND DATA FIELD INDICATING ROLE OF SECOND VEHICLE NODE IN SECOND PLATOON

533

DETERMINE THAT IDENTIFIER OF FIRST PLATOON IS DIFFERENT FROM IDENTIFIER OF SECOND PLATOON

535

DETERMINE THAT THE SECOND VEHICLE NODE HAS JOINED THE PLATOON

536

MODIFYING SECOND DATA FIELD IN DATA STRUCTURE OF FIRST VEHICLE NODE FROM FIRST ROLE TO SECOND ROLE

537

TRANSMIT MESSAGE FROM FIRST VEHICLE NODE WITH FIRST DATA FIELD AND SECOND DATA FIELD BASED ON FIRST AND SECOND DATA FIELDS IN DATA STRUCTURE

539

RECEIVE MESSAGE FROM SECOND VEHICLE NODE WITH FIRST DATA FIELD INDICATING THE FIRST PLATOON AND SECOND DATA FIELD THAT INDICATES THE FIRST ROLE OF SECOND VEHICLE IN FIRST PLATOON

541

END

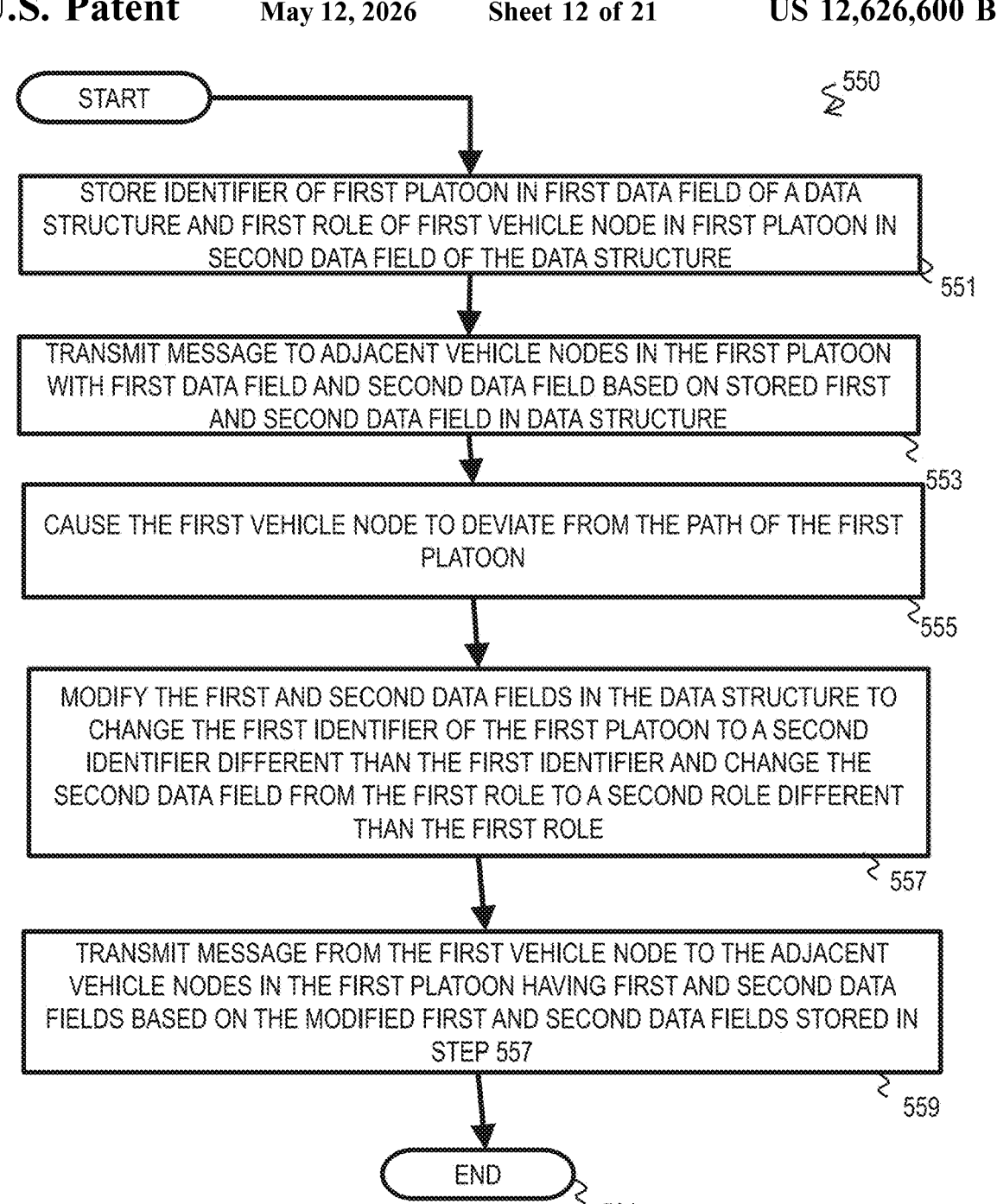

550

START

STORE IDENTIFIER OF FIRST PLATOON IN FIRST DATA FIELD OF A DATA STRUCTURE AND FIRST ROLE OF FIRST VEHICLE NODE IN FIRST PLATOON IN SECOND DATA FIELD OF THE DATA STRUCTURE

551

TRANSMIT MESSAGE TO ADJACENT VEHICLE NODES IN THE FIRST PLATOON WITH FIRST DATA FIELD AND SECOND DATA FIELD BASED ON STORED FIRST AND SECOND DATA FIELD IN DATA STRUCTURE

553

CAUSE THE FIRST VEHICLE NODE TO DEVIATE FROM THE PATH OF THE FIRST PLATOON

555

MODIFY THE FIRST AND SECOND DATA FIELDS IN THE DATA STRUCTURE TO CHANGE THE FIRST IDENTIFIER OF THE FIRST PLATOON TO A SECOND IDENTIFIER DIFFERENT THAN THE FIRST IDENTIFIER AND CHANGE THE SECOND DATA FIELD FROM THE FIRST ROLE TO A SECOND ROLE DIFFERENT THAN THE FIRST ROLE

557

TRANSMIT MESSAGE FROM THE FIRST VEHICLE NODE TO THE ADJACENT VEHICLE NODES IN THE FIRST PLATOON HAVING FIRST AND SECOND DATA FIELDS BASED ON THE MODIFIED FIRST AND SECOND DATA FIELDS STORED IN STEP 557

559

END

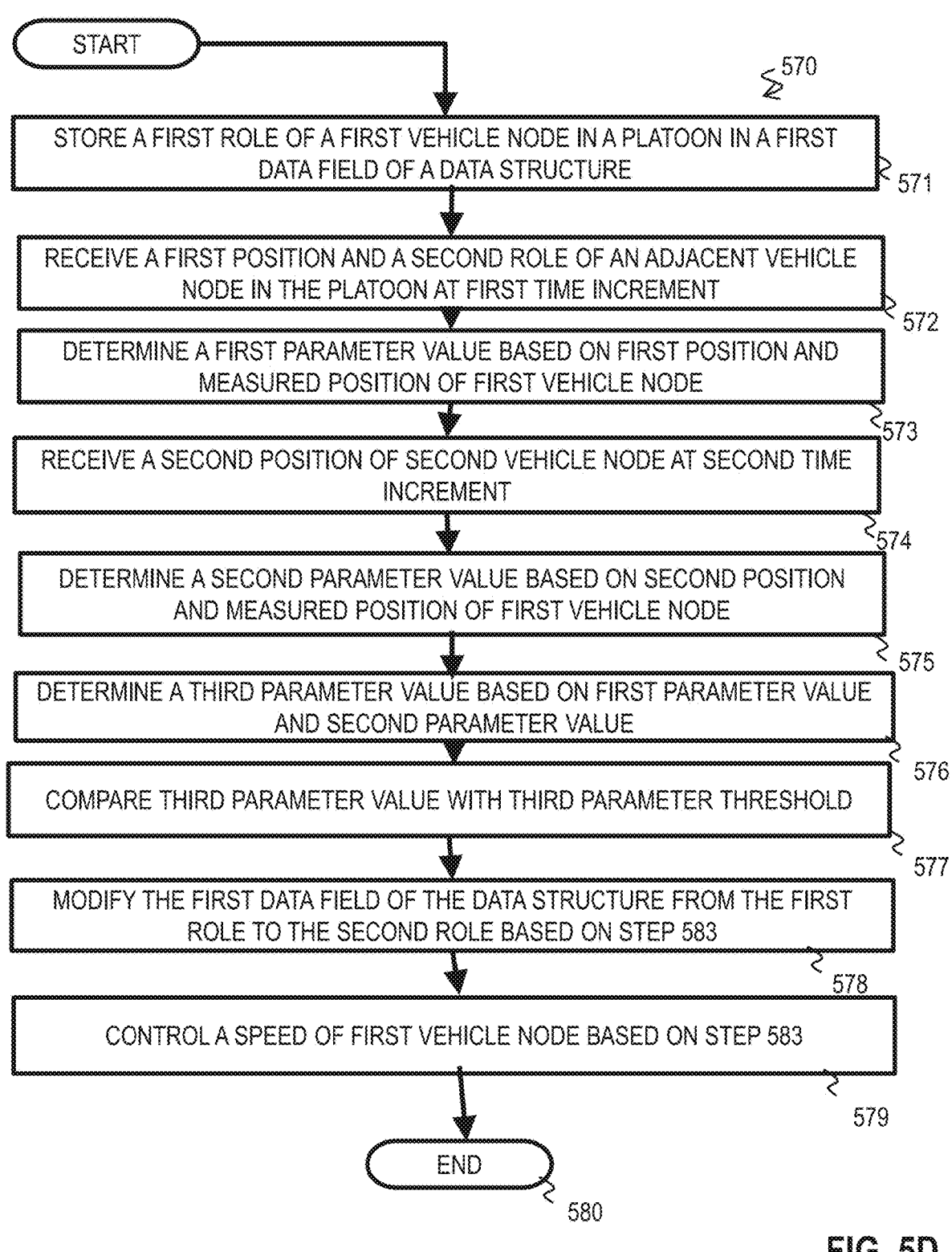

START

STORE A FIRST ROLE OF A FIRST VEHICLE NODE IN A PLATOON IN A FIRST DATA FIELD OF A DATA STRUCTURE    571

570

RECEIVE A FIRST POSITION AND A SECOND ROLE OF AN ADJACENT VEHICLE NODE IN THE PLATOON AT FIRST TIME INCREMENT    572

DETERMINE A FIRST PARAMETER VALUE BASED ON FIRST POSITION AND MEASURED POSITION OF FIRST VEHICLE NODE    573

RECEIVE A SECOND POSITION OF SECOND VEHICLE NODE AT SECOND TIME INCREMENT    574

DETERMINE A SECOND PARAMETER VALUE BASED ON SECOND POSITION AND MEASURED POSITION OF FIRST VEHICLE NODE    575

DETERMINE A THIRD PARAMETER VALUE BASED ON FIRST PARAMETER VALUE AND SECOND PARAMETER VALUE    576

COMPARE THIRD PARAMETER VALUE WITH THIRD PARAMETER THRESHOLD    577

MODIFY THE FIRST DATA FIELD OF THE DATA STRUCTURE FROM THE FIRST ROLE TO THE SECOND ROLE BASED ON STEP 583    578

CONTROL A SPEED OF FIRST VEHICLE NODE BASED ON STEP 583    579

END    580

FIG. 5D

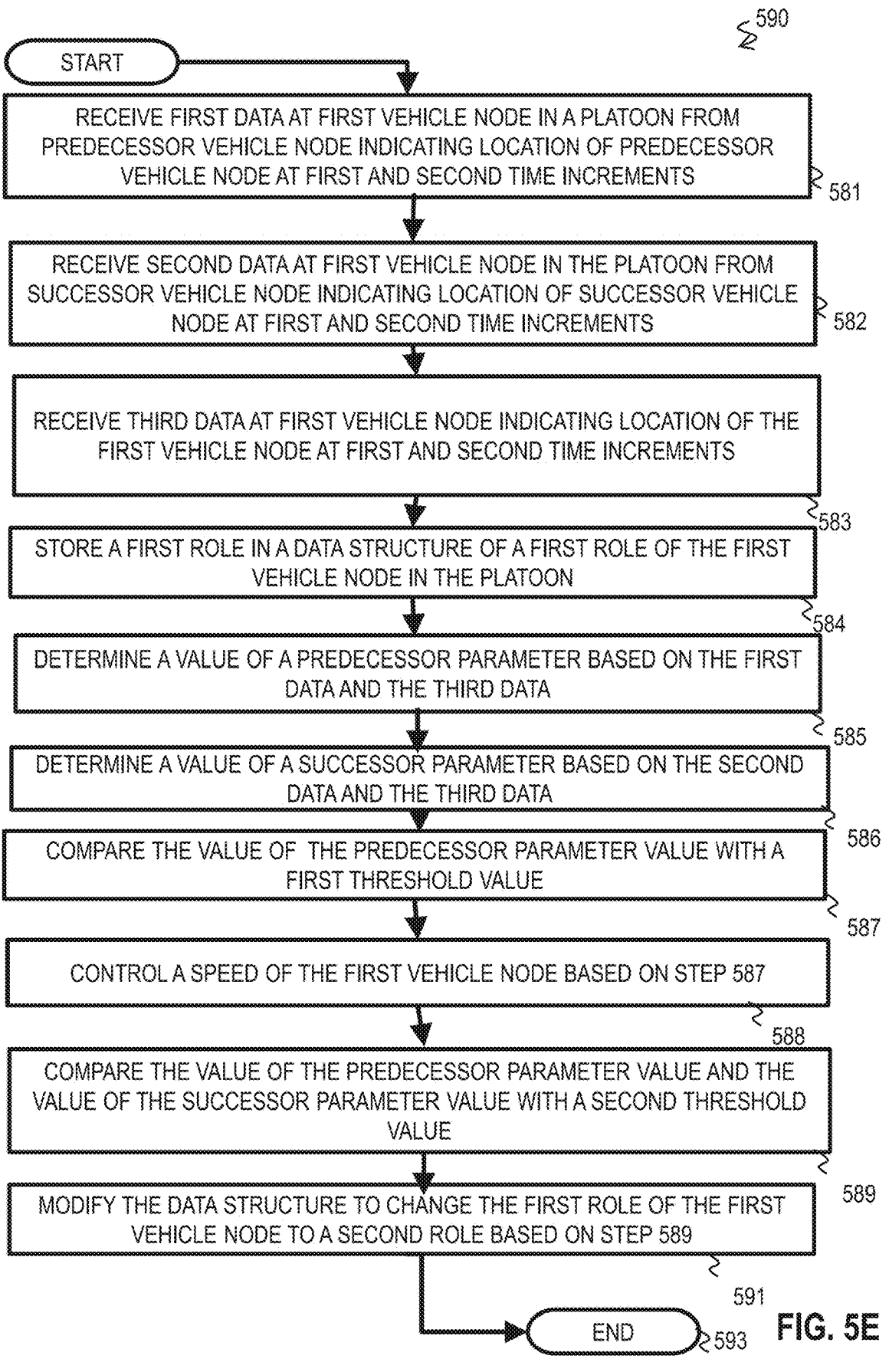

590

START

RECEIVE FIRST DATA AT FIRST VEHICLE NODE IN A PLATOON FROM PREDECESSOR VEHICLE NODE INDICATING LOCATION OF PREDECESSOR VEHICLE NODE AT FIRST AND SECOND TIME INCREMENTS
581

RECEIVE SECOND DATA AT FIRST VEHICLE NODE IN THE PLATOON FROM SUCCESSOR VEHICLE NODE INDICATING LOCATION OF SUCCESSOR VEHICLE NODE AT FIRST AND SECOND TIME INCREMENTS
582

RECEIVE THIRD DATA AT FIRST VEHICLE NODE INDICATING LOCATION OF THE FIRST VEHICLE NODE AT FIRST AND SECOND TIME INCREMENTS
583

STORE A FIRST ROLE IN A DATA STRUCTURE OF A FIRST ROLE OF THE FIRST VEHICLE NODE IN THE PLATOON
584

DETERMINE A VALUE OF A PREDECESSOR PARAMETER BASED ON THE FIRST DATA AND THE THIRD DATA
585

DETERMINE A VALUE OF A SUCCESSOR PARAMETER BASED ON THE SECOND DATA AND THE THIRD DATA
586

COMPARE THE VALUE OF THE PREDECESSOR PARAMETER VALUE WITH A FIRST THRESHOLD VALUE
587

CONTROL A SPEED OF THE FIRST VEHICLE NODE BASED ON STEP 587
588

COMPARE THE VALUE OF THE PREDECESSOR PARAMETER VALUE AND THE VALUE OF THE SUCCESSOR PARAMETER VALUE WITH A SECOND THRESHOLD VALUE
589

MODIFY THE DATA STRUCTURE TO CHANGE THE FIRST ROLE OF THE FIRST VEHICLE NODE TO A SECOND ROLE BASED ON STEP 589
591

END
593

GRAPH 700

$$MAX(\forall\ v,\ RMS_v(MSE(5\ runs))) = 0.001$$
where, $v$: Vehicle ID
   $MSE$: Mean Squared Error
   $RMS$: Root Mean Square

704

Time (sec)

702

GRAPH 750

$$MAX(\forall\ v,\ RMS_v(MSE(5\ runs))) = 0.009$$
where, $v$: Vehicle ID
   $MSE$: Mean Squared Error
   $RMS$: Root Mean Square

704

Time (sec)

702

SYSTEM AND METHOD FOR AUTONOMOUSLY MANEUVERING VEHICLE NODES IN A PLATOON

CROSS-REFERENCE TO RELATED APPLICATIONS

This application claims benefit of Provisional Appln. 63/333,869, filed Apr. 22, 2022, the entire contents of which are hereby incorporated by reference as if fully set forth herein, under 35 U.S.C. § 119(e).

BACKGROUND

According to the U.S. Department of Transportation (USDOT), platooning is a coordinated operation of two or more vehicle nodes via cooperative adaptive cruise control (CACC). Platooning provides a number of benefits, including: fuel efficiency, road capacity, and road safety. Early research on platooning and automated vehicular systems mainly focused on steady-state cruising stage, which regulates speed and inter-vehicle node spacing. The problems of platoon maneuvering such as formation and dissolution have been less explored and only recently have started to receive attention from researchers and practitioners.

SUMMARY

Techniques are provided for a system and method for autonomously maneuvering vehicle nodes in a platoon. A novel decentralized platooning scheme is disclosed, which uses simple rules that vehicle nodes follow to carry out platooning maneuvers. Maneuvers such as join and exit emerge as a result of vehicle nodes following these rules.

Conventional methods for maneuvering vehicle nodes in a platoon include centralized platooning systems, where all platooning activities are coordinated by a leader, usually the vehicle node at the front of the platoon. Like any centralized system, the inventors of the present invention recognized that these centralized platooning systems suffer from drawbacks such as single point of failure and performance bottleneck (at the leader), as well as shorter platoon-length and data loss due to longer range communication from the leader.

To address the drawbacks of central platooning systems, decentralized platooning systems were proposed, where there is no platoon leader and vehicle nodes interact only with neighboring vehicle nodes to complete the maneuvers. Localized interactions allow decentralized platooning systems to handle longer platoons.

The inventors of the present invention recognized that generally, conventional platooning systems, known as deliberate systems, adopt top-down approaches where high-level objectives, in this case, the maneuvers, are defined and then workflows, including message exchange, specific for each maneuver are defined. The inventors of the present invention developed an alternative platooning approach to these deliberate systems that adopts a bottom-up approach. This alternative platooning approach first lays out basic rules of interaction, which vehicle nodes would then follow to carry out the platooning maneuver.

In a first set of embodiments, a method is provided for autonomously maneuvering vehicle nodes in a platoon. The method includes receiving, at a first vehicle node, first data that indicates a value of a position at a first time increment of a second vehicle node among a plurality of vehicle nodes within a platoon traveling along a path. The method further includes determining a value of a first parameter based on the first data and a measured value of a position of the first vehicle node at the first time increment. The method further includes receiving, at the first vehicle node, second data that indicates a value of the position of the second vehicle node at a second time increment after the first time increment. The method further includes determining a value of a second parameter based on the second data and a measured value of the position of the first vehicle node at the second time increment. The method further includes determining a value of a third parameter based on the value of the first parameter and the value of the second parameter. The method further includes comparing the value of the third parameter with a threshold value for the third parameter. The method further includes controlling a value of a speed of the first vehicle node based on the comparing step.

In a second set of embodiments, a method is provided for autonomously maneuvering vehicle nodes in a platoon. The method includes storing, in a data structure, a plurality of data fields including a first data field to store an identifier of a first platoon and a second data field to store a role of a first vehicle node within the first platoon identified by the first data field. The method further includes receiving, at the first vehicle node, a first message from a second vehicle node having a plurality of data fields including a first data field that indicates an identifier of a second platoon of the second vehicle node and a second data field that indicates a role of the second vehicle node within the second platoon identified by the first data field. The method further includes determining that the identifier of the second platoon in the first data field of the first message does not correspond to the identifier of the first platoon in the first data field of the data structure. The method further includes modifying the plurality of data fields of the data structure to change the second data field from the first role of the first vehicle node within the first platoon to a second role of the first vehicle within the first platoon that is different from the first role. The method further includes transmitting, from the first vehicle node, a second message to the second vehicle node with the plurality of data fields that indicate the first data field and the second data field stored in the data structure. The method further includes receiving, at the first vehicle node, a third message from the second vehicle node having a plurality of data fields including a first data field that indicates the identifier of the first platoon and a second data field that indicates the first role of the second vehicle node within the first platoon.

In a third set of embodiments, a method is provided for autonomously maneuvering vehicle nodes in a platoon. The method includes storing, in a data structure, a plurality of data fields including a first data field to store a first identifier of a first platoon comprising a plurality of vehicle nodes traveling along a path and a second data field to store a first role of a first vehicle node within the first platoon identified by the first data field. The method further includes causing the first vehicle node to deviate from the path of the first platoon. The method further includes modifying the plurality of data fields stored within the data structure to change the first data field from the first identifier of the first platoon to a second identifier different from the first identifier and to change the second data field from the first role to a second role of the first vehicle node different from the first role.

In a fourth set of embodiments, a method is provided for autonomously maneuvering vehicle nodes in a platoon. The method includes storing, in a data structure, a first data field indicating a first role of a first vehicle node within a platoon including a plurality of vehicle nodes. The method further includes receiving, at the first vehicle node, first data that indicates a value of a position at a first time increment of an adjacent vehicle node among the plurality of vehicle nodes in the platoon and a second role of the adjacent vehicle node within the platoon. The method further includes determining a value of a first parameter based on the first data and a measured value of a position of the first vehicle node at the first time increment. The method further includes receiving, at the first vehicle node, second data that indicates a value of the position of the adjacent vehicle node at a second time increment after the first time increment. The method further includes determining a value of a second parameter based on the second data and a measured value of the position of the first vehicle node at the second time increment. The method further includes determining a value of a third parameter based on the value of the first parameter and the value of the second parameter. The method further includes comparing the value of the third parameter with a threshold value for the third parameter. The method further includes modifying the first data field in the data structure from the first role to the second role based on the comparing step. The method further includes controlling a speed of the first vehicle node based on the comparing step.

In a fifth set of embodiments, a method is provided for autonomously maneuvering vehicle nodes in a platoon. The method includes receiving, at a first vehicle node in a platoon, first data from a predecessor vehicle node in the platoon indicating a location of the predecessor vehicle node at first and second time increments. The method further includes receiving, at the first vehicle node, second data from a successor vehicle node in the platoon indicating a location of the successor vehicle node at the first and second time increments. The method further includes receiving, at the first vehicle node, third data that indicates a measured location of the first vehicle node at the first and second time increments. The method further includes storing, in a data structure, a first role of the first vehicle node in the platoon. The method further includes determining a value of a predecessor parameter based on the first data and the third data. The method further includes determining a value of a successor parameter based on the second data and the third data. The method further includes comparing the value of the predecessor parameter with a first threshold value. The method further includes controlling a speed of the first vehicle node based on the comparing the value of the predecessor parameter with the threshold value. The method further includes comparing the value of the predecessor parameter and the value of the successor parameter with a second threshold value. The method further includes modifying the data structure to change the first role of the first vehicle node to a second role based on the comparing the value of the predecessor parameter and the value of the successor parameter with the second threshold.

In a sixth set of embodiments, an apparatus or computer readable medium is provided for enacting one or more of the methods previously discussed.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 5B is a flow diagram that illustrates an example of a method performed by the processor of the non-joining vehicle nodes in FIGS. 3A through 3C, according to an embodiment;

FIG. 5C is a flow diagram that illustrates an example of a method performed by the processor of the exiting vehicle node in FIGS. 4A through 4C, according to an embodiment;

FIG. 5D is a flow diagram that illustrates an example of a method performed by the processor of the non-exiting vehicle nodes in FIGS. 4A through 4C, according to an embodiment;

FIG. 5E is a flow diagram that illustrates an example of a method performed by the processor of the vehicle nodes in FIG. 1B, according to an embodiment;

FIG. 6C is an image that illustrates an example of data exchange between an exiting vehicle node and the lead member vehicle node in a conventional platooning method;

DETAILED DESCRIPTION

A method and apparatus are described for autonomously maneuvering vehicle nodes in a platoon. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of autonomous maneuvering of vehicle nodes in the platoon. However, the invention is not limited to this context. In other embodiments the platoon comprises a fleet of boats or ship or a troop of robots.

1. Overview

Figure 1A:
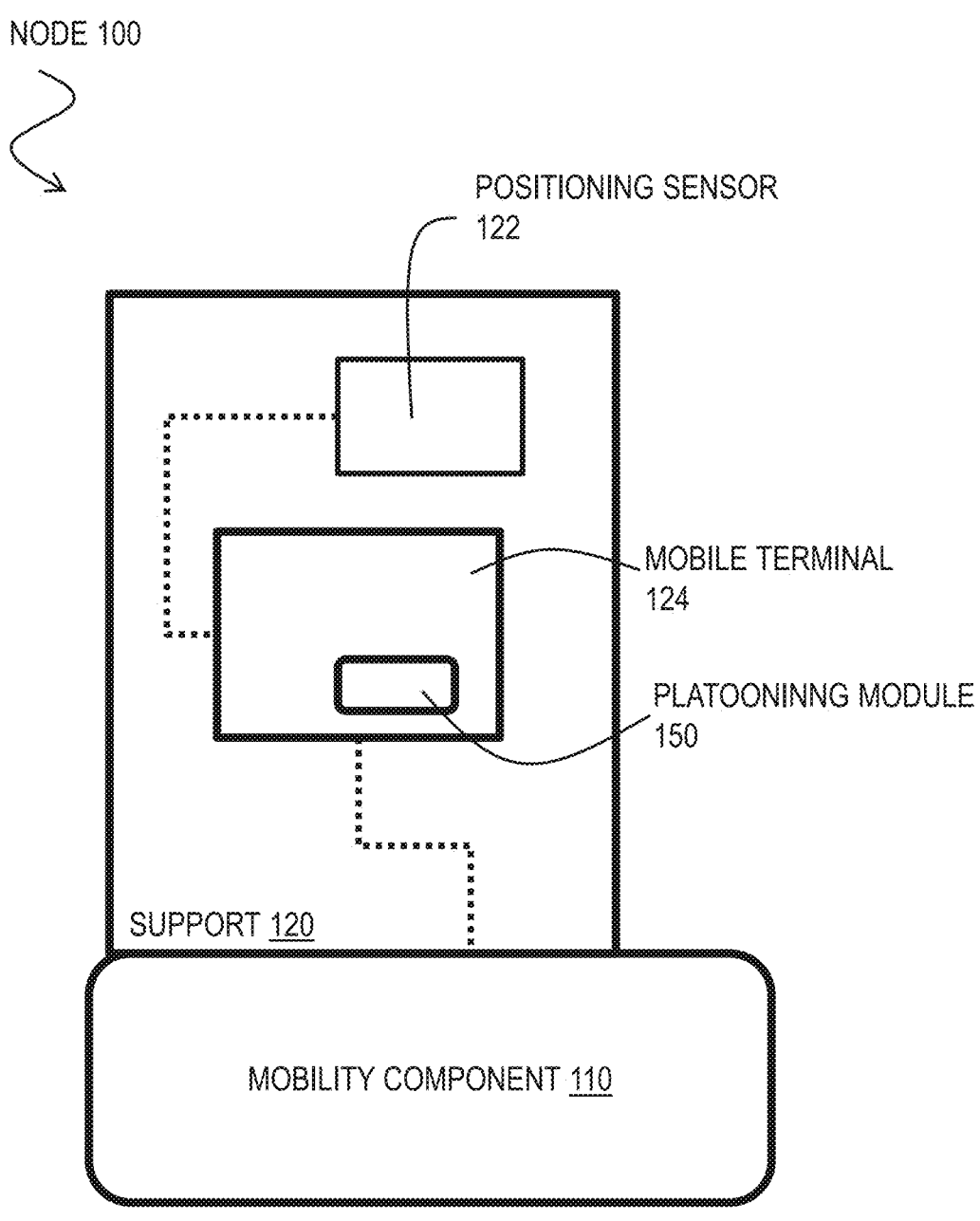
FIG. 1A is a block diagram that illustrates an example vehicle node, according to an embodiment.

FIG. 1A is a block diagram that illustrates an example vehicle node 100, according to an embodiment. In the illustrated embodiment, the vehicle node 100 includes a support 120, a mobility component 110 attached to the support 120, a positioning sensor 122 attached to the support 120 and a mobile terminal 124 attached to the support 120. The mobile terminal 124 is configured with a platooning module 150 as described in greater detail hereafter.

In an embodiment, the mobility component 110 is configured to facilitate movement of the vehicle node 100 (e.g. between two locations of a path along which a platoon of vehicle nodes is traveling). In one embodiment, the mobility component 110 includes wheels, treads, flight propellers or any known means for facilitating movement of the vehicle node 100 along a path, as appreciated by one of ordinary skill in the art. In one example embodiment, the mobility component 110 includes a means for propulsion (e.g. motor, engine, propeller, etc.) to move the vehicle node 100 along a path (e.g., a path of a platoon including a plurality of vehicle nodes). In this example embodiment, upon receiving a signal from the mobile terminal 124 (e.g. that indicates a second location to move the vehicle node 100), the mobility component 110 automatically moves the vehicle node 100 from the first location to the second location. In other embodiments, the mobility component 110 excludes a means for propulsion and the vehicle node 100 is moved by an external means for propulsion (e.g. a user pulls or carries the vehicle node 100 with another vehicle, etc.).

In some embodiments, the surveillance node 100 includes the positioning sensor 122 (e.g. Global Positioning System or GPS) and routing software to facilitate location or movement of the vehicle node 100 from the first location to the second location. In an example embodiment, the mobile terminal 124 sends and receives signals from the positioning sensor 122 and upon receiving a signal from the positioning sensor 122 that the vehicle node 100 is at the second location, the mobile terminal 124 transmits a signal to the mobile component 110 to cease movement of the vehicle node 100. In other embodiments, the positioning information is received from another source such as from the CPS on a vehicle carrying or otherwise propelling the node.

Figures 1B, 1C:
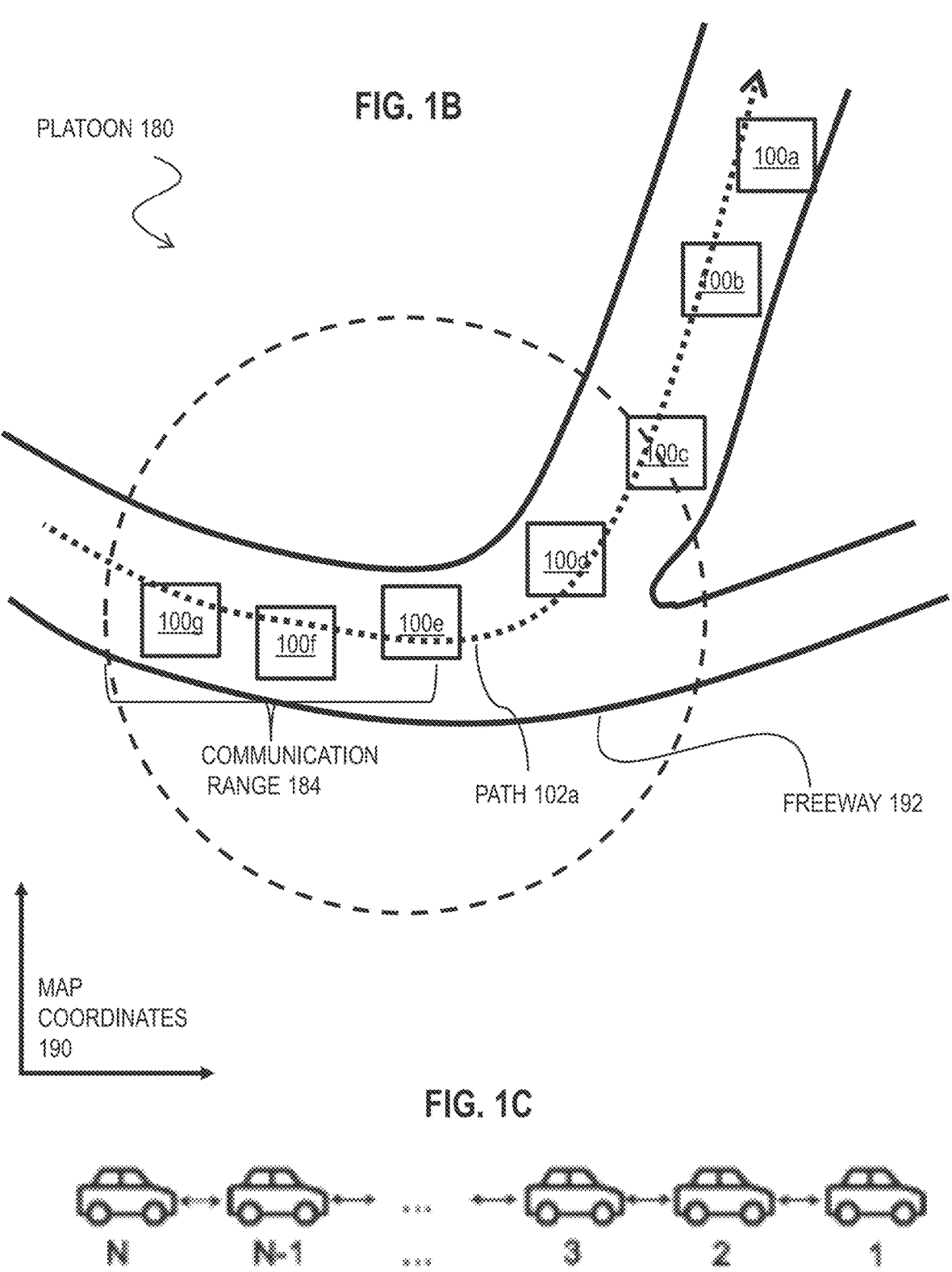
FIG. 1B is a block diagram that illustrates an example of a plurality of vehicle nodes of FIG. 1A arranged in a platoon traveling along a path on a freeway, according to an embodiment.
FIG. 1C is a block diagram that illustrates an example of data exchange between adjacent vehicle nodes of the platoon of FIG. 1B, according to an embodiment.

FIG. 1B is a block diagram that illustrates an example of a plurality of vehicle nodes 100a through 100g of FIG. 1A arranged in a platoon 180 traveling along a path 102a on a freeway 192, according to an embodiment. For purposes of this description, "platoon" means a group of two or more vehicle nodes which share one or more common characteristics (e.g. a common path 102, a common spacing between adjacent vehicle nodes, a common speed among the vehicle nodes, etc.).

Communication between vehicle nodes 100 is now discussed. FIG. 1C depicts a block diagram showing communication between adjacent vehicle nodes of the platoon. In one embodiment, each vehicle node transmits and receives data messages from adjacent vehicle nodes (e.g., predecessor vehicle node and successor vehicle node). In an embodiment, the mobile terminal 124 of the vehicle node 100e has an antenna (e.g., antenna 1117 of the mobile station 1101) that is configured to transmit and receive signals within a communication range 184 of the vehicle node 100c. In an example embodiment, the antenna is configured to transmit signals that indicate data (e.g., a current location of the vehicle node 100e, an identifier of the vehicle node 100e, an identifier of the platoon 180 and a role of the vehicle node 100e within the platoon 180, etc.) to other vehicle nodes 100d, 100f, 100g within the communication range 184. In some embodiments, the communication is via a cell phone system using cell phone towers within a range of several miles. In other embodiments, communication channels occur over local decentralized radio transmissions, such as: Dedicated Short-Range Communications (DSRC) that is a wireless communication technology that enables vehicles to communicate with each other and other road users directly, without involving cellular or other infrastructure; IEEE 802.11 (wifi); and Cellular Vehicle-to-Everything (C-V2X) that is a unified connectivity platform designed to offer vehicles low-latency vehicle-to-vehicle (V2V), vehicle-to-roadside infrastructure (V2I), and vehicle-to-pedestrian (V2P) communication.

In an embodiment, the antenna of the vehicle node 100e is also configured to detect signals from other vehicle nodes 100d, 100f, 100g within the communication range 184 that indicate data (e.g. current location of the other vehicle nodes, an identifier of the other vehicle nodes, an identifier of the platoon 180, a role of each of the other vehicle nodes in the platoon 180, etc.). In various embodiments, any wired or wireless communication modes may be used, including any known communication optical or radio frequency channels or protocols. Wireless communications provide the advantage of longer communication ranges and unimpeded independent movement of the various nodes in the network.

In an embodiment, the mobile terminal 124 is provided to facilitate one or more maneuvers of vehicle nodes 100 with respect to the platoon 180. In some embodiments, the mobile terminal 124 is provided to facilitate a join maneuver, in which a vehicle node 100 that is not in the platoon 180 joins the platoon 180. In other embodiments, the mobile terminal 124 is provided to facilitate an exit maneuver, in which a vehicle node 100 that is in the platoon 180 exits the platoon 180. In these embodiments, the mobile terminal 124 of each vehicle node 100 involved in the maneuver controls operation of each of the vehicle nodes 100 during the maneuver (e.g. operation of the positioning sensor 122 and/or the mobility component 110). In an embodiment, the mobile terminal 124 comprises the mobile station 1101 of FIG. 11 that includes a processor such as the main control unit (MCU) 1103 to facilitate communication with one or more components of the vehicle node 100 and that performs one or more steps of the methods discussed herein.

Figure 9:
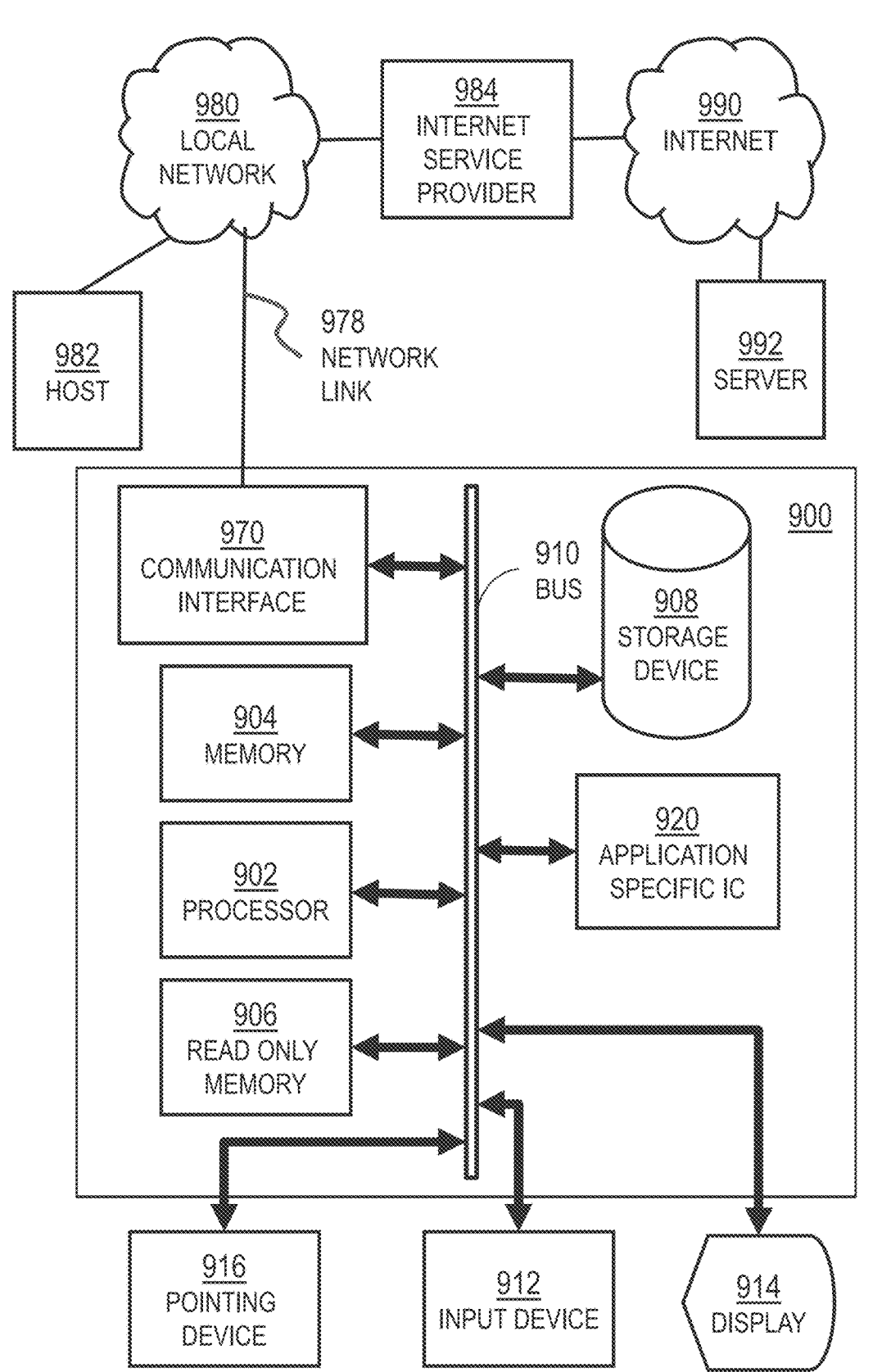
FIG. 9 is a block diagram that illustrates an example computer system upon which an embodiment of the invention may be implemented.
Figure 10:
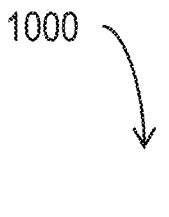
FIG. 10 is a block diagram that illustrates an example chip set upon which an embodiment of the invention may be implemented.
Figure 10:
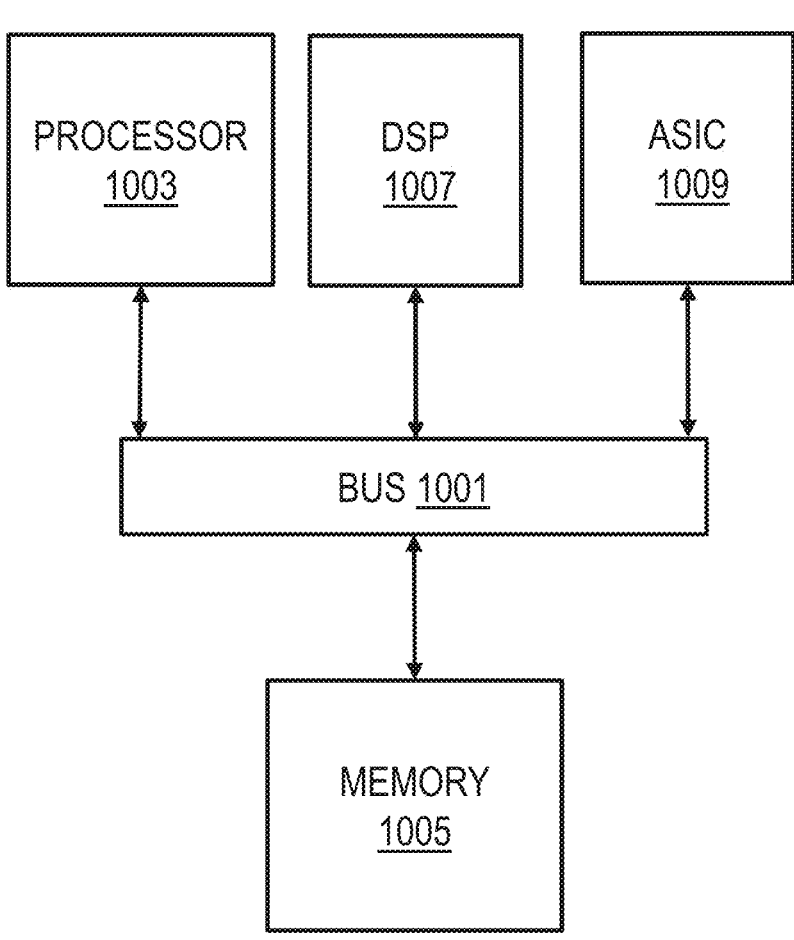
Figure 11:
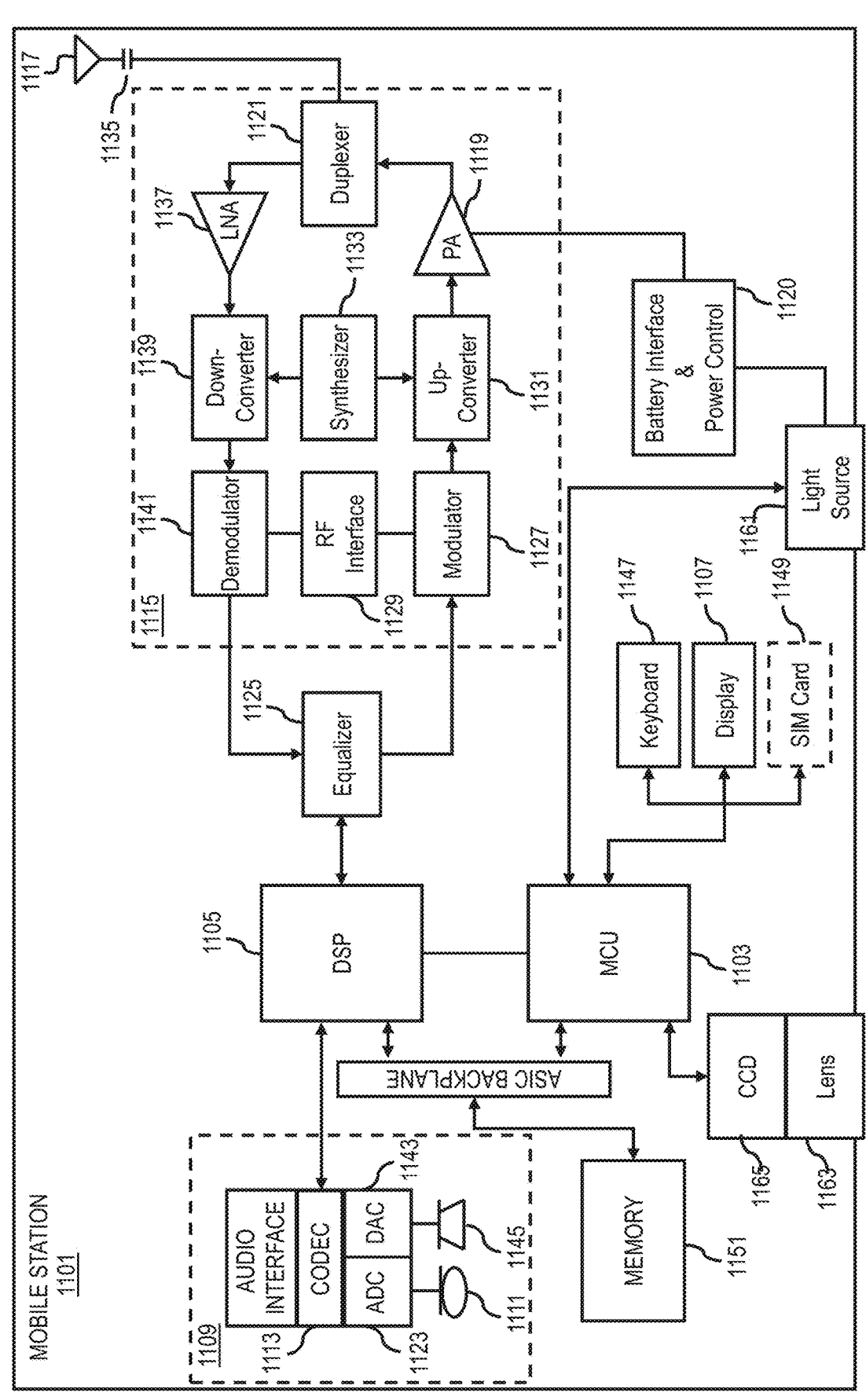
FIG. 11 is a block diagram that illustrates a mobile terminal upon which an embodiment of the invention may be implemented.

In one embodiment, during one of the platoon maneuvers, the mobile terminal 124 of the vehicle node 100e receives signals that indicate data of the vehicle node 100e (e.g. current location) from the positioning sensor 122. In another embodiment, the mobile terminal 124 receives signals from the antenna that indicate data (e.g. current location of the other vehicle nodes, an identifier of the other vehicle nodes, an identifier of the platoon 180 and a role of each of the other vehicle nodes within the platoon 180) from other vehicle nodes 100d, 100f, 100g within the communication range 184 of the vehicle node 100e. The mobile terminal 124 includes a platooning module process 150 to perform one or more steps of a method described below with reference to FIGS. 5A through 5D. In various embodiments, the mobile terminal 124 comprises one or more general purpose computer systems or upgraded computer systems that include graphics processing units, as depicted in FIG. 9 or one or more chip sets as depicted in FIG. 10 or one or more mobile stations 1101 as depicted in FIG. 11, and instructions to cause the computer or chip set or mobile station to perform one or more steps of a method described below with reference to FIGS. 5A through 5D.

In an embodiment, the vehicle node 100 includes the support 120 that mounts the positioning sensor 122 and mobile terminal 124 to the mobility component 110. In an example embodiment, the vehicle node 100 is a car, a truck, a tank, a boat, a ship, or a robot.

FIG. 1B is a block diagram that illustrates an example platoon 180 in which the vehicle node 100e (similar to the vehicle node 100 of FIG. 1A) is included, according to an embodiment. In an embodiment, the platoon 180 includes vehicle nodes 100a through 100g. In an example embodiment, each vehicle node 100a through 100g is similar to the vehicle node 100 of FIG. 1A. Although seven vehicle nodes are depicted in the platoon 180, the platoon 180 is not limited to any particular number of vehicle nodes and can include less or more than depicted in FIG. 1B. Additionally, the communication range 184 is depicted for the vehicle node 100e, however the remaining vehicle nodes have a communication range that may be the same or different than the vehicle node 100e. In an example embodiment, vehicle nodes 100d, 100f, 100g are within the communication range 184 of the vehicle node 100c and thus data can be received from the vehicle nodes 100d, 100f, 100g by the vehicle node 100e, if no intervening terrain obstructs the view. In contrast, vehicle nodes 100a, 100b are outside the communication range 184 of the vehicle node 100e and thus data from these vehicle nodes 100a, 100b cannot be detected by the vehicle node 100e, even if no intervening terrain obstructs the view. However, data from the other vehicle nodes 100a, 100b can be detected provided they are within the communication range 184 of any of the vehicle nodes 100a through 100g.

Storage of data received at each vehicle node 100 will now be discussed. In an embodiment, each of the vehicle nodes 100 transmits a message at regular time increments that includes one or more data fields pertaining to the transmitting vehicle node (e.g. a current location of the vehicle node, an identifier of the vehicle node, an identifier of the platoon of the vehicle node and a role of the vehicle node within the platoon). These messages are received by other vehicle nodes within the communication range 184 of the transmitting vehicle node 100 and these other vehicle nodes store the data in these received messages at each time increment.

Figure 2A:
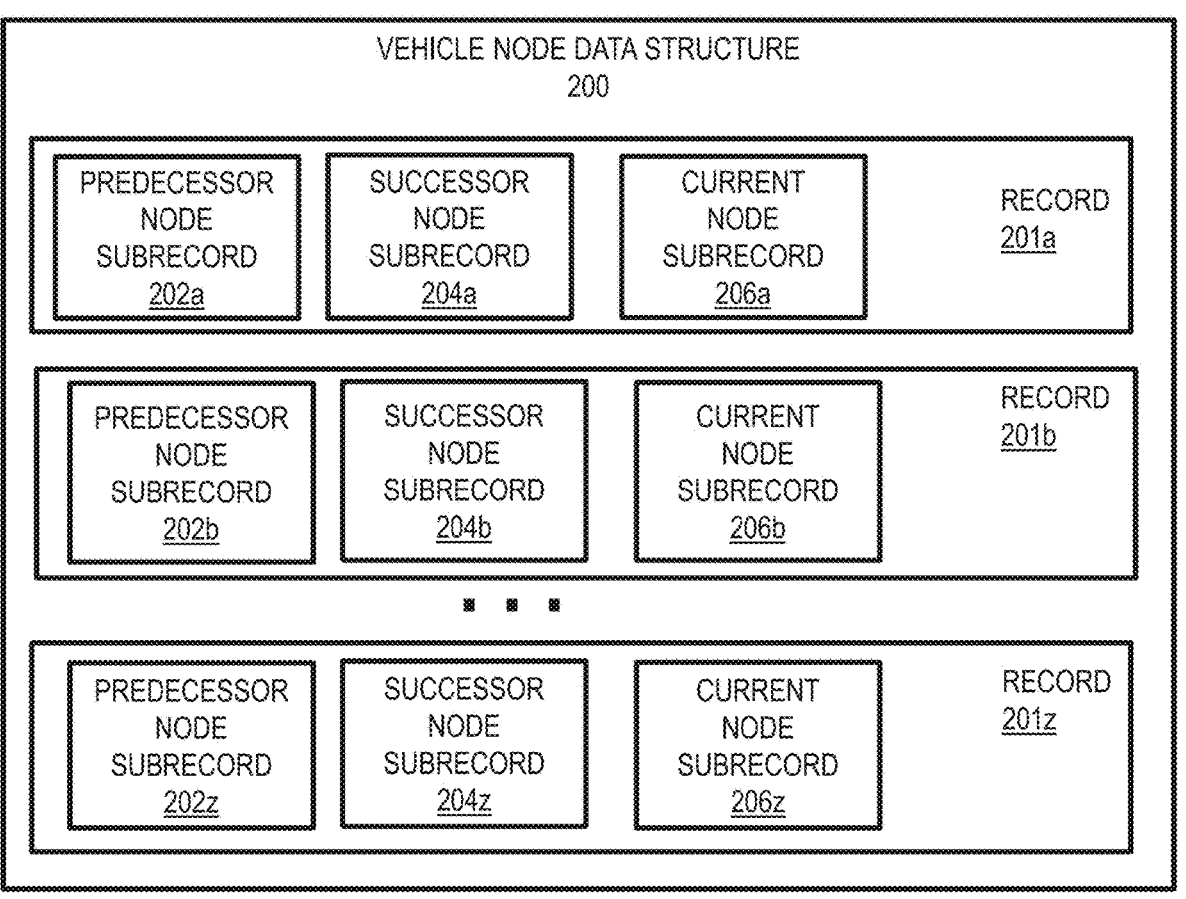
FIG. 2A is a block diagram that illustrates an example vehicle node data structure, according to an embodiment.

For purposes of simplicity, data storage will be discussed herein with respect to the vehicle node 100c of FIG. 1B, however the other vehicle nodes 100 are configured to store the data in a similar manner. In an embodiment, the vehicle nodes 100d, 100f, 100g transmit a message at regular time increments. Since these vehicle nodes 100d, 100f, 100g are within the communication range 184 of the vehicle node 100e, these messages are received by the vehicle node 100e. In some embodiments, upon receiving these messages at each time increment, the mobile terminal 124 of the vehicle node 100c stores this data in a data structure. FIG. 2A is a block diagram that illustrates an example vehicle node data structure 200, according to an embodiment. In an embodiment, the data structure 200 includes a plurality of records 201, where each record 201 is used to store data received at a respective time increment. In an example embodiment, record 201a is used to store data received at a first time increment and record 201b is used to store data received at a second time increment. Although FIG. 2A depicts records 201a through 201z, the data structure 200 is not limited to this number of records and includes as many records as necessary to store the received data at each vehicle node 100.

In an embodiment, each record 201 includes a plurality of subrecords 202, 204, 206. In one embodiment, each subrecord 202, 204, 206 stores data received from different vehicle nodes 100 at the same time increment. In an example embodiment, the subrecord 202 stores data received from a predecessor vehicle node (e.g. vehicle node 100d); the subrecord 204 stores data received from a successor vehicle node (e.g. vehicle node 100f) and the subrecord 206 stores data for the current vehicle node (e.g. vehicle node 100e).

In an embodiment, each subrecord 202, 204, 206 includes a plurality of fields 210, 212, 214, 216 that store a value of a respective data field within the message received from a respective vehicle node. In one embodiment, the position field 210 is used to store a value of the current location field of the message received from the vehicle node. In another embodiment, the ID field 212 is used to store a value of the vehicle node identifier field of the message received from the vehicle node. In another embodiment, the platoon ID field 214 is used to store a value of the platoon identifier field of the message received from the vehicle node. In another embodiment, the node role field 216 is used to store a value of the vehicle node role field of the message received from the vehicle node. In an example embodiment, the node role field 216 includes one of a plurality of roles for a vehicle node within a platoon (e.g. a non-member role of a vehicle node that is not in the platoon, a joining member role of a vehicle node attempting to join the platoon, a tail member role of a vehicle node at the tail of the platoon, an in-member role of a vehicle node positioned in an interior of the platoon and a lead member role of a vehicle node positioned at the front of the platoon).

Figure 2B:
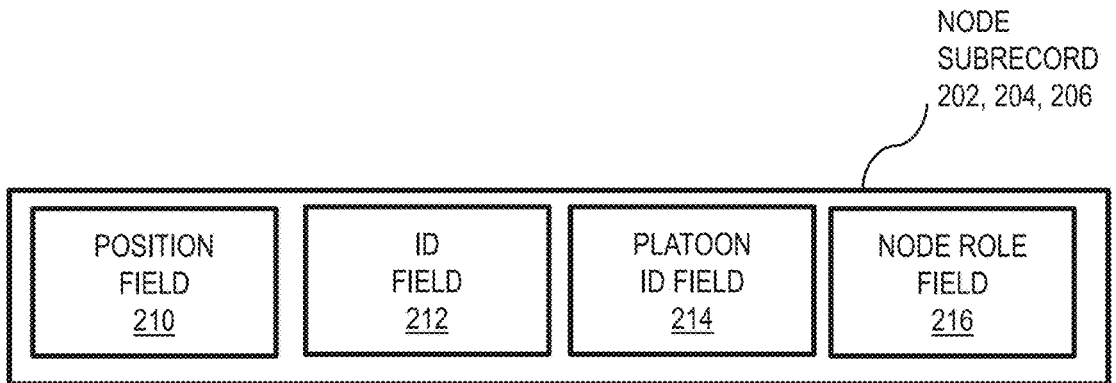
FIG. 2B is a block diagram that illustrates an example node subrecord within the data structure of FIG. 2A, according to an embodiment.

Although data structures, messages and fields are depicted in FIG. 2A, and subsequent diagrams in FIG. 2B, as integral blocks in a particular order for purposes of illustration, in other embodiments, one or more data structures or messages or fields, or portions thereof, are arranged in a different order, in the same or different number of data structures or databases in one or more hosts or messages, or are omitted, or one or more additional fields are included, or the data structures and messages are changed in some combination of ways.

1.1 Joining Vehicle Node

Figure 3A:
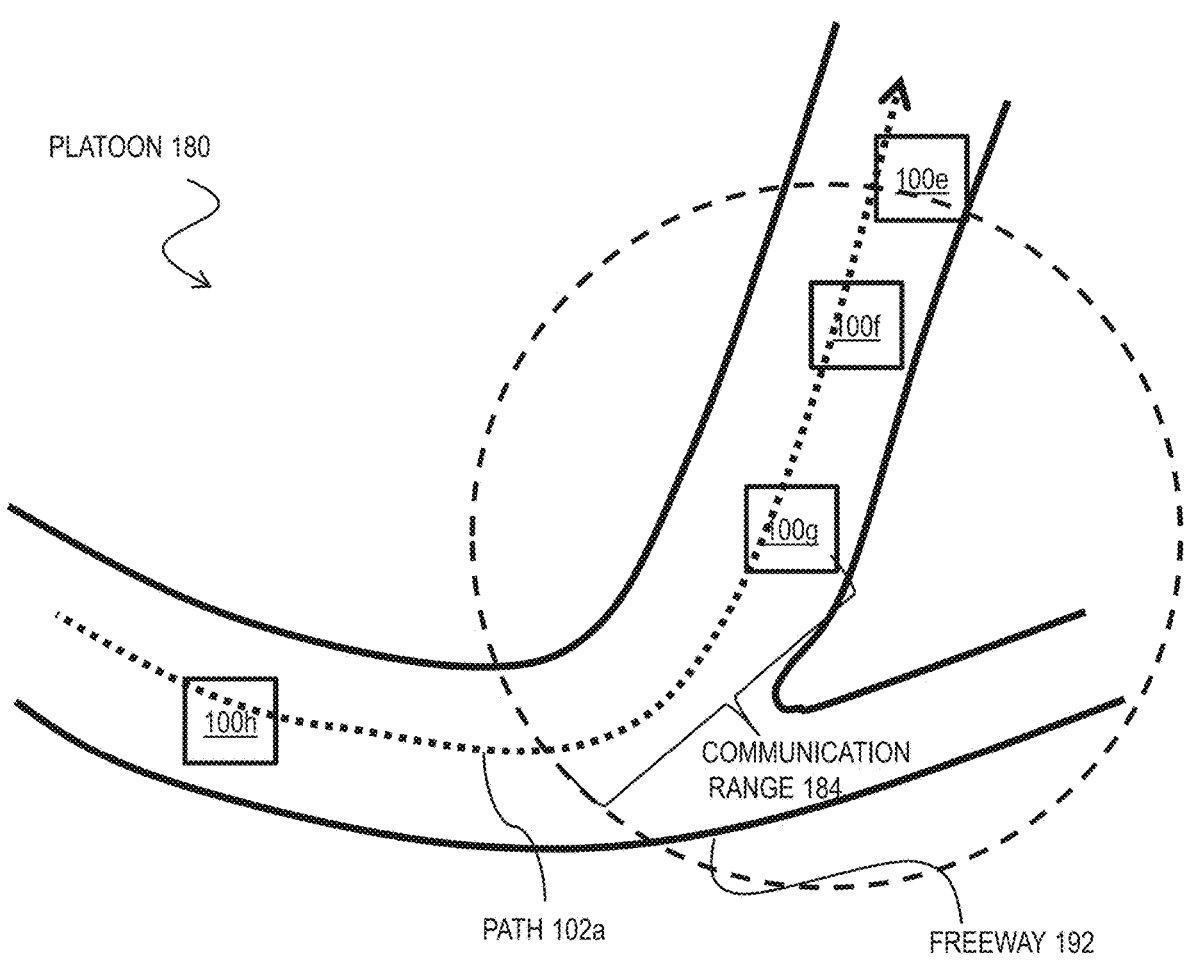
FIGS. 3A through 3C are block diagrams that illustrate an example of stages of a join maneuver of a vehicle node to the platoon of FIG. 1B, according to an embodiment.
Figure 3B:
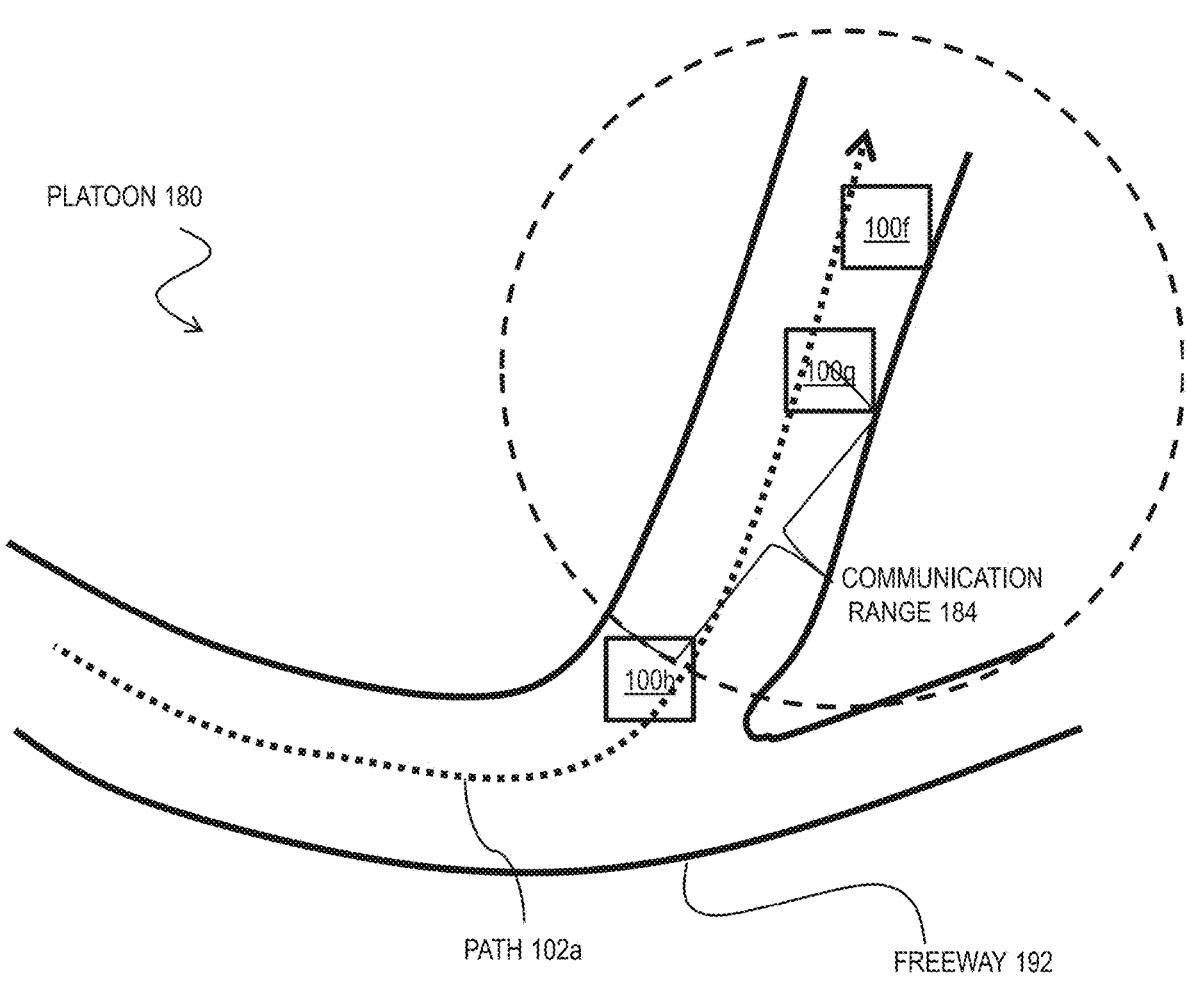
Figure 3C:
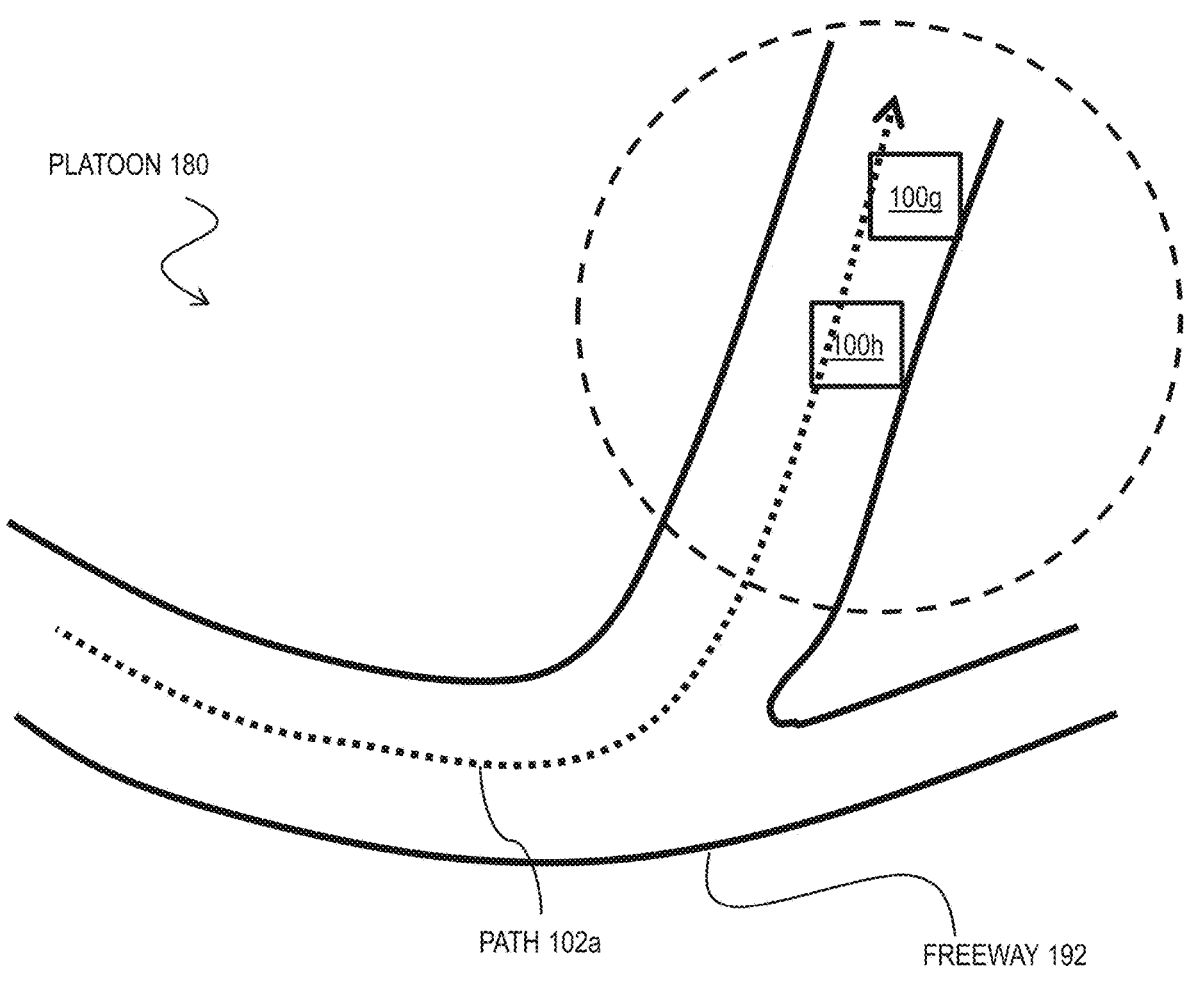

The steps of the method will now be discussed with respect to a vehicle node that joins the platoon during a joining maneuver. FIGS. 3A through 3C are block diagrams that illustrate an example of stages of a join maneuver of a vehicle node 100h to the platoon 180 of FIG. 1B, according to an embodiment. In this embodiment, the method is discussed as performed by the mobile terminal 124 of the vehicle node 100h seeking to join the platoon 180.

Figure 5A:
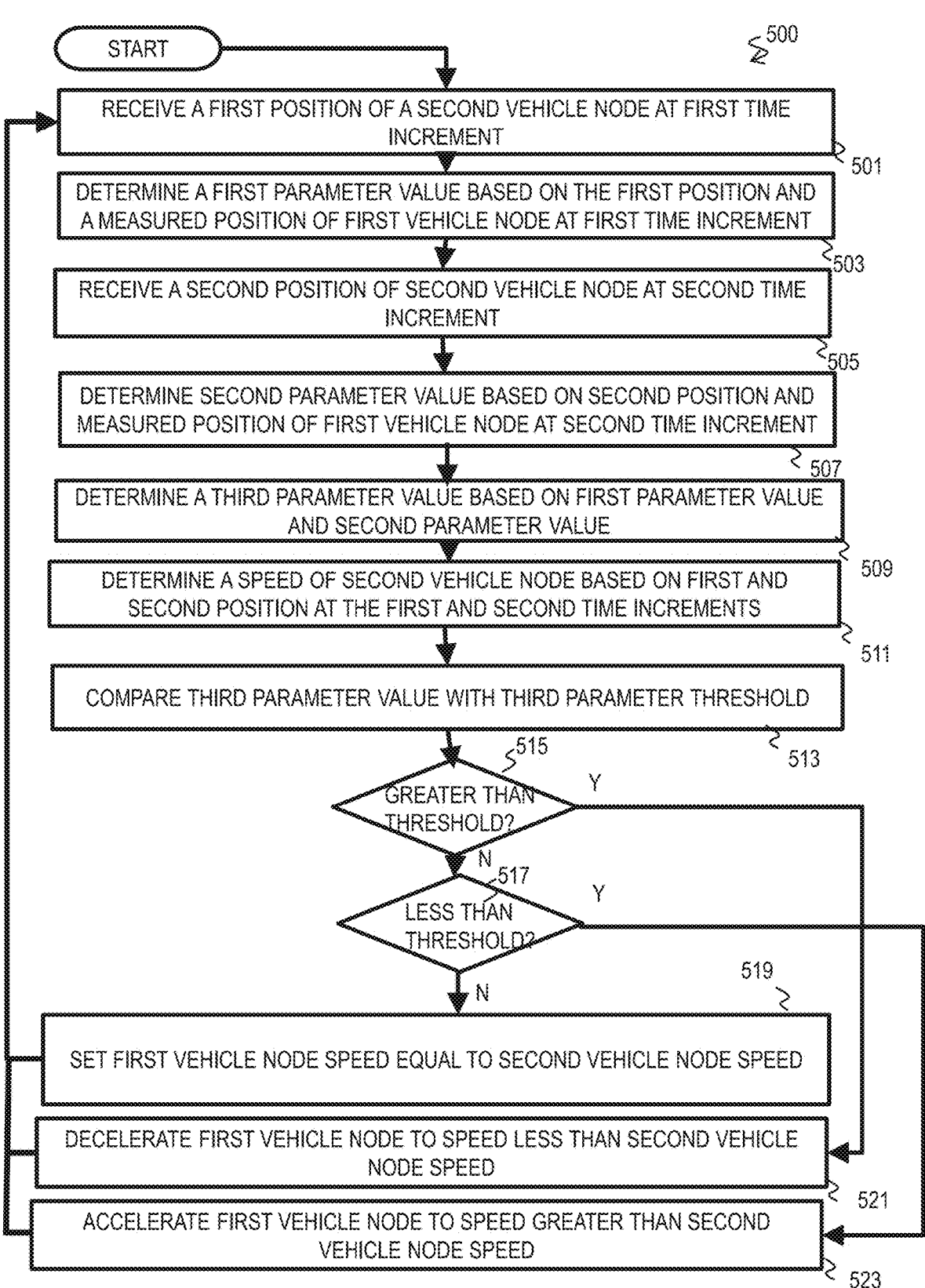
FIG. 5A is a flow diagram that illustrates an example of a method performed by the processor of the joining vehicle node in FIGS. 3A through 3C, according to an embodiment.

FIG. 5A is a flow diagram that illustrates an example of a method 500 performed by the mobile terminal 124 of the joining vehicle node 100h in FIGS. 3A through 3C, according to an embodiment. Although steps are depicted in FIG. 5A, and in subsequent flowcharts FIGS. 5B through 5D, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

As shown in FIG. 3A, the vehicle node 100h is not within the platoon 180 and is traveling along the freeway 192. In an embodiment, the vehicle node 100h is outside of the communication range 184 of the tail vehicle node 100g and thus the vehicle node 100h has not received any data message from the tail vehicle node 100g. In an example embodiment, the vehicle node 100h is traveling at a maximum speed limit of the freeway 192 that is less than the speed of the platoon 180. In an example embodiment, the node role field 216 stored in the data structure 200 of the vehicle node 100h indicates a non-member role of the vehicle node 100h, since the vehicle node 100h is not a member of a platoon.

As the vehicle node 100h travels from the location in FIG. 3A to the location in FIG. 3B, the vehicle node 100h reaches a location within the communication range 184 of the tail vehicle node 100g. As shown in FIG. 3B, since the vehicle node 100h is within the communication range 184 of the tail vehicle node 100g, at a first time increment the vehicle node 100h receives a data message from the tail member vehicle node 100g. In one embodiment, in step 501 at the first time increment the vehicle node 100h receives a first data message from the tail member vehicle node 100g that indicates one or more data fields (e.g., a current location of the vehicle node 100g, an identifier of the vehicle node 100g, an identifier of the platoon 180 and a tail member role of the vehicle node 100g within the platoon 180). In an example embodiment, the mobile terminal 124 of the vehicle node 100h stores this data in the fields 210, 212, 214, 216 of the predecessor node subrecord 202a of the first record 201a corresponding to the first time increment.

The vehicle node 100h updates its role based on the received message from the vehicle node 100g. In an embodiment, upon receiving the data message from the vehicle node 100g, the mobile terminal 124 changes the non-member role to a joiner role in the node role field 216 of the current node subrecord 206a for the first record 201a.

At each time increment, the vehicle node 100h measures its own current location using the positioning sensor 122 and stores this data in the data structure 200. In an embodiment, at the first time increment the mobile terminal 124 of the vehicle node 100h determines the current location of the vehicle node 100h from the positioning sensor 122 and stores this data in the position field 210 of the current node subrecord 206a of the first record 201a.

In one embodiment, in step 503 a first parameter value is determined based on the current location of the vehicle node 100g received in step 501 and the measured location of the vehicle node 100h at the first time increment. In one embodiment, the first parameter value is determined based on:

$$PP_1 = \frac{1}{\text{gap}} = \frac{1}{\sqrt{\left(x_t^1 - x_r^1\right)^2}} \tag{1}$$

where $PP_1$ is the first parameter for a predecessor vehicle node; gap is the separation between the vehicle node 100g and the vehicle node 100h at the first time increment, $$x_t^1$$

is the current location of the vehicle node 100g at the first time increment and $$x_r^1$$

is the current location of the vehicle node 100h at the first time increment.

In one embodiment, in step 505 at the second time increment the vehicle node 100h receives a second data message from the tail member vehicle node 100g that indicates one or more data fields (e.g., a current location of the vehicle node 100g, an identifier of the vehicle node 100g, an identifier of the platoon 180 and a tail member role of the vehicle node 100g within the platoon 180). In an example embodiment, the mobile terminal 124 of the vehicle node 100h stores this data in the fields 210, 212, 214, 216 of the predecessor node subrecord 202b of the second record 201b corresponding to the second time increment.

In another example embodiment, at the second time increment the mobile terminal 124 of the vehicle node 100h determines the current location of the vehicle node 100h from the positioning sensor 122 and stores this data in the position field 210 of the current node subrecord 206b of the second record 201b corresponding to the second time increment.

In one embodiment, in step 507 a second parameter value is determined based on the current location of the vehicle node 100g received in step 505 and the measured location of the vehicle node 100h at the second time increment. In one embodiment, the second parameter values is determined based on:

$$PP_2 = \frac{1}{\text{gap}} = \frac{1}{\sqrt{\left(x_t^2 - x_r^2\right)^2}} \tag{2}$$

where $PP_2$ is the second parameter for a predecessor vehicle node; gap is the separation between the vehicle node 100g and the vehicle node 100h at the second time increment;

$$x_t^2$$

is the current location of the vehicle node 100g at the second time increment and $$x_t^2$$

is the current location of the vehicle node 100h at the second time increment.

In one embodiment, in step 509 a third parameter value is determined based on the first parameter value from step 503 and the second parameter value from step 507. In one embodiment, the third parameter value is determined based on:

$$PP_3 = \frac{P_1 + P_2}{2} \tag{3}$$

where $PP_3$ is the third parameter for a predecessor vehicle node.

In one embodiment, in step 511 a speed of the vehicle node 100g is determined based on the location of the vehicle node 100g at the first time increment and at the second time increment. In an example embodiment, this data is stored in the position field 210 of the predecessor node subrecords 202a, 202b corresponding to the first and second records 201a, 201b. In one example embodiment, in step 511 the speed of the second vehicle 100g is determined based on:

$$S_t = \frac{\sqrt{((x_t^2 - x_t^1))^2}}{\partial t} \tag{4}$$

Where $S_t$ is the speed of the second vehicle 100g between the first and second time increments;

$$x_t^2$$

is the current location of the vehicle node 100g at the second time increment;

$$x_t^1$$

is the current location of the vehicle node 100g at the first time increment; and δt is the time increment between the first and second time increments.

In one embodiment, in step 513 the third parameter value from step 509 is compared with a threshold value for the third parameter. In some embodiments, the threshold value for the third parameter is a single value. In other embodiments, the threshold value for the third parameter is a range of values. In an example embodiment, the threshold value for the third parameter is an inverse of a desired gap between adjacent vehicle nodes in the platoon. In another example embodiments, the range of threshold values for the third parameter is an inverse of a range of desired gap values between adjacent vehicle nodes in the platoon. In an example embodiment, the desired gap is about 15 meters (m) or in a range from about 10 m to about 20 m and/or in a range from about 8 m to about 25 m.

In one embodiment, in step 515 a determination is made whether the value of the third parameter in step 509 is greater than the threshold value of the third parameter in step 513. If this determination is in the affirmative, the method 500 moves to block 521. If this determination is in the negative, the method 500 moves to block 517.

In one embodiment, in step 521 the speed of the vehicle node 100h is controlled based on the determination in step 515. In this embodiment, in step 515 it was determined that the value of the third parameter in step 509 is greater than the threshold value of the third parameter in step 513. Thus, the gap between the vehicle nodes 100g, 100h after the first and second time increments is less than the desired gap. Accordingly, in step 521 the speed of the vehicle node 100h is reduced to a speed that is less than the speed of the vehicle node 100g determined in step 511. In an example embodiment, in step 521 the mobile terminal 124 transmits a signal to the mobility component 100, to reduce the speed of the vehicle node 100h.

In one embodiment, in step 517 a determination is made whether the value of the third parameter in step 509 is less than the threshold value of the third parameter in step 513. If this determination is in the affirmative, the method 500 moves to block 523. If this determination is in the negative, the method 500 moves to block 519.

In one embodiment, in step 523 the speed of the vehicle node 100h is controlled based on the determination in step 517. In this embodiment, in step 517 it was determined that the value of the third parameter in step 509 is less than the threshold value of the third parameter in step 513. Thus, the gap between the vehicle nodes 100g, 100h after the first and second time increments is greater than the desired gap. Accordingly, in step 523 the speed of the vehicle node 100h is increased to a speed that is greater than the speed of the vehicle node 100g determined in step 511. In an example embodiment, in step 523 the mobile terminal 124 transmits a signal to the mobility component 110, to increase the speed of the vehicle node 100h. This causes the vehicle node 100h to catch up to the tail member vehicle node 100g in order to join the platoon 180. Between FIGS. 3B and 3C, the vehicle node 100h catches up to the tail member vehicle node 100g of the platoon 180, based on steps 517 and 523.

In one embodiment, in step 519 the speed of the vehicle node 100h is controlled based on the determination in steps 515, 517. In this embodiment, based on negative determinations in both steps 515, 517 it was determined that the value of the third parameter in step 509 is equal to the threshold value of the third parameter in step 513 (or is within a range of threshold values for the third parameter). Thus, the gap between the vehicle nodes 100g, 100h after the first and second time increments is at the desired gap. This is depicted in FIG. 3C where the vehicle node 100h has caught up to the tail member vehicle node 100g and has attained the desired gap. Accordingly, in step 519 the speed of the vehicle node 100h is maintained at a speed that is equal to the speed of the vehicle node 100g determined in step 511. In an example embodiment, in step 519 the mobile terminal 124 transmits a signal to the mobility component 100, to maintain the speed of the vehicle node 100h. This causes the vehicle node 100h to maintain the desired gap with the vehicle node 100g. After steps 519, 521, 523, the method 500 loops back to step 501 unless the platoon has reached a desired destination in which case the method 500 ends.

After completing the join maneuver, the vehicle node 100h updates its status. In one embodiment, the join maneuver is completed based on step 519 and the vehicle node 100*h* updates its role in the node role field 216 of the current node subrecord 206 to a tail member role. Additionally, after completing the join maneuver, the vehicle node 100*h* updates its platoon ID in the platoon ID field 214 of the current node subrecord 206 to indicate the platoon 180. Although FIGS. 3A through 3C illustrate a vehicle node 100*h* joining a tail of the platoon 180, in other embodiments the method disclosed herein can be used to facilitate a join maneuver at any location within the platoon 180.

1.2 Non-Joining Vehicle Node

The steps of the method will now be discussed with respect to non-joining vehicle nodes of the platoon during a joining maneuver. In this embodiment, the method is discussed as performed by the mobile terminal 124 of the tail member vehicle node 100*g* during the join maneuver of the vehicle node 100*h* to the platoon 180. FIG. 5B is a flow diagram that illustrates an example of a method 530 performed by the mobile terminal 124 of the non-joining vehicle node 100*g* in FIGS. 3A through 3C, according to an embodiment.

In a first step of the method 530, one or more parameters of the platoon 180 and the non-joining vehicle node in the platoon 180 are stored in a data structure. In an embodiment, in step 531 an identifier of the platoon 180 and an identifier of the role of the non-joining vehicle node in the platoon 180 is stored in a data structure. In one embodiment, in step 531 the mobile terminal 124 of the vehicle node 100*g* stores an identifier of the platoon 180 in the platoon ID field 214 of the current node subrecord 206*a* of the first record 201*a*. In another embodiment, in step 531 the mobile terminal 124 of the vehicle node 100*g* stores an identifier of the tail member role of the vehicle node 100*g* in the node role field 216 of the current node subrecord 206*a*.

In a second step of the method 530, the non-joining vehicle receives data from a vehicle node attempting to join the platoon 180. In an embodiment, in step 533 the mobile terminal 124 of the vehicle node 100*g* receives a message from the vehicle node 100*h* based on the vehicle node 100*h* reaching within the communication range 184 of the vehicle node 100*g* (FIG. 3B). In an example embodiment, the received message includes the data fields previously discussed with respect to the data messages received by the joining vehicle 100*h* in section 1.1. In one embodiment, in step 533 the received message at the vehicle node 100*g* includes a first data field with an identifier of a platoon that is different from the identifier of the platoon 180 stored in the platoon ID field 214 of the current node subrecord 206. The received message also includes a second data field with an identifier indicating a role of the vehicle node 100*h*. In an example embodiment, the first data field excludes an identifier of a platoon and the second data field includes a non-member role since the vehicle node 100*h* is not in a platoon.

In a third step of the method 530, the non-joining vehicle compares the parameters of the platoon 180 and the non-joining vehicle node from step 531 with the data fields of the message received from the joining vehicle from step 533. In an embodiment, in step 535 the mobile terminal 124 of the vehicle node 100*g* compares the identifier of the platoon 180 stored in the platoon ID field 214 of the current node subrecord 206*a* with the first data field of the received message. In an example embodiment, in step 535 the mobile terminal 124 determines that the identifier of the platoon 180 in the platoon ID field 214 is different from the platoon identifier in the first data field of the received message. In this example embodiment, this determination by the mobile terminal 124 of the vehicle node 100*g* indicates that the vehicle node 100*h* is not in the platoon 180 and is attempting to join the platoon 180.

In a fourth step of the method 530, the vehicle node 100*g* determines that the vehicle node 100*h* has joined in the platoon 180. In an embodiment, in step 536 the mobile terminal 124 of the vehicle node 100*g* determines that the gap between the vehicle nodes 100*g*, 100*h* reached a desired gap range and/or that the speed of the vehicle node 100*h* is within a threshold range of the speed of the vehicle node 100*g* (FIG. 3C). In an example embodiment, in step 536 the mobile terminal 124 of the vehicle node 100*g* determines one or more of the first parameter value, the second parameter value and the third parameter value between the vehicle nodes 100*g*. 100*h* over a first and second time increment in a similar manner as discussed with respect to steps 501 through 509. Additionally, in an example embodiment, in step 536 the mobile terminal 124 of the vehicle node 100*g* determines the speed of the vehicle node 100*h* between a first and second time increment, in a similar manner as in step 511. In this example embodiment, the vehicle node 100*g* determines that the vehicle node 100*h* has joined the platoon 180 based on the third parameter threshold being about equal to the third parameter threshold value and/or the speed of the vehicle node 100*h* being about equal to the speed of the vehicle node 100*g*.

In a fifth step of the method 530, after determining that the vehicle node 100*h* has joined the platoon 180 the vehicle node 100*g* updates its role within the platoon 180. In an embodiment, in step 537 the mobile terminal 124 of the vehicle node 100*g* changes the value of the node role field 216 of the current node subrecord 206 from the tail member role to an in-member role (e.g. indicating that the vehicle node 100*g* is an in-member between the tail member and the lead member).

In a sixth step of the method 530, the vehicle node 100*g* transmits a message to the joining vehicle node 100*h* with a plurality of data fields including a first data field to indicate the platoon ID field 214 of the platoon 180 and a second data field to indicate the updated in-member role of the vehicle node 100*g* within the platoon 180. In an embodiment, in step 539 the vehicle node 100*g* transmits a message to the vehicle node 100*h* with an identifier of the platoon 180 to the new tail member vehicle node 100*h* so that the vehicle node 100*h* can update the platoon ID field 214 of the current node record 206 stored in the data structure 200 at the vehicle node 100*h* to indicate the platoon 180. As previously discussed, upon receiving this message from the vehicle node 100*g*, the mobile terminal 124 of the joining vehicle node 100*h* updates the node role field 216 to the tail member role (previously occupied by the vehicle node 100*g*).

In a sixth step 541 of the method 530, the vehicle node 100*g* receives a message from the new tail member vehicle 100*h* with a plurality of data fields including the updated first data field indicating the platoon 180 and the updated second data field indicating the tail member role of the vehicle node 100*h* within the platoon 180.

1.3 Exiting Vehicle Node

Figure 4A:
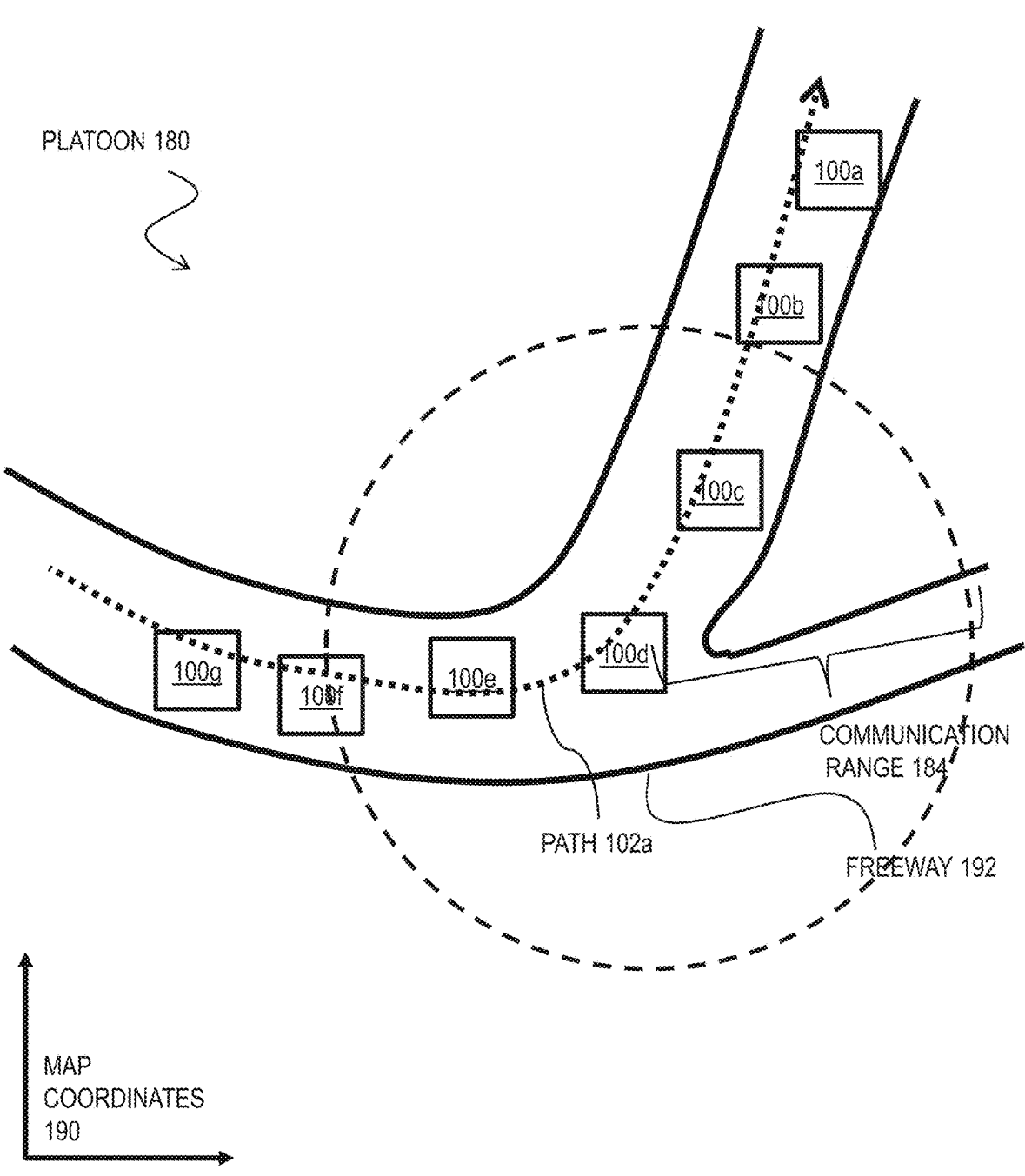
FIGS. 4A through 4C are block diagrams that illustrate an example of stages of an exit maneuver of a vehicle node from the platoon of FIG. 1B, according to an embodiment.
Figure 4B:
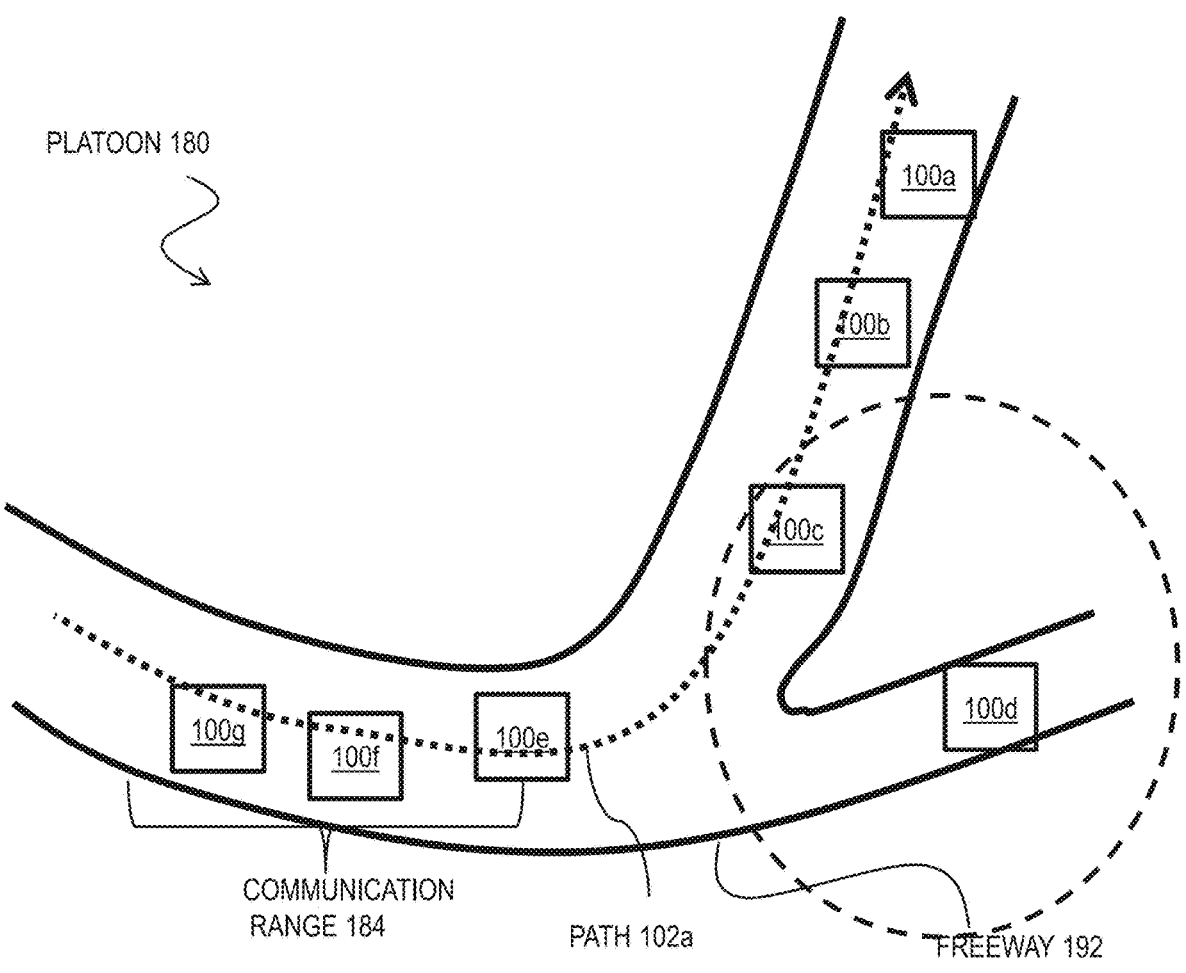
Figure 4C:
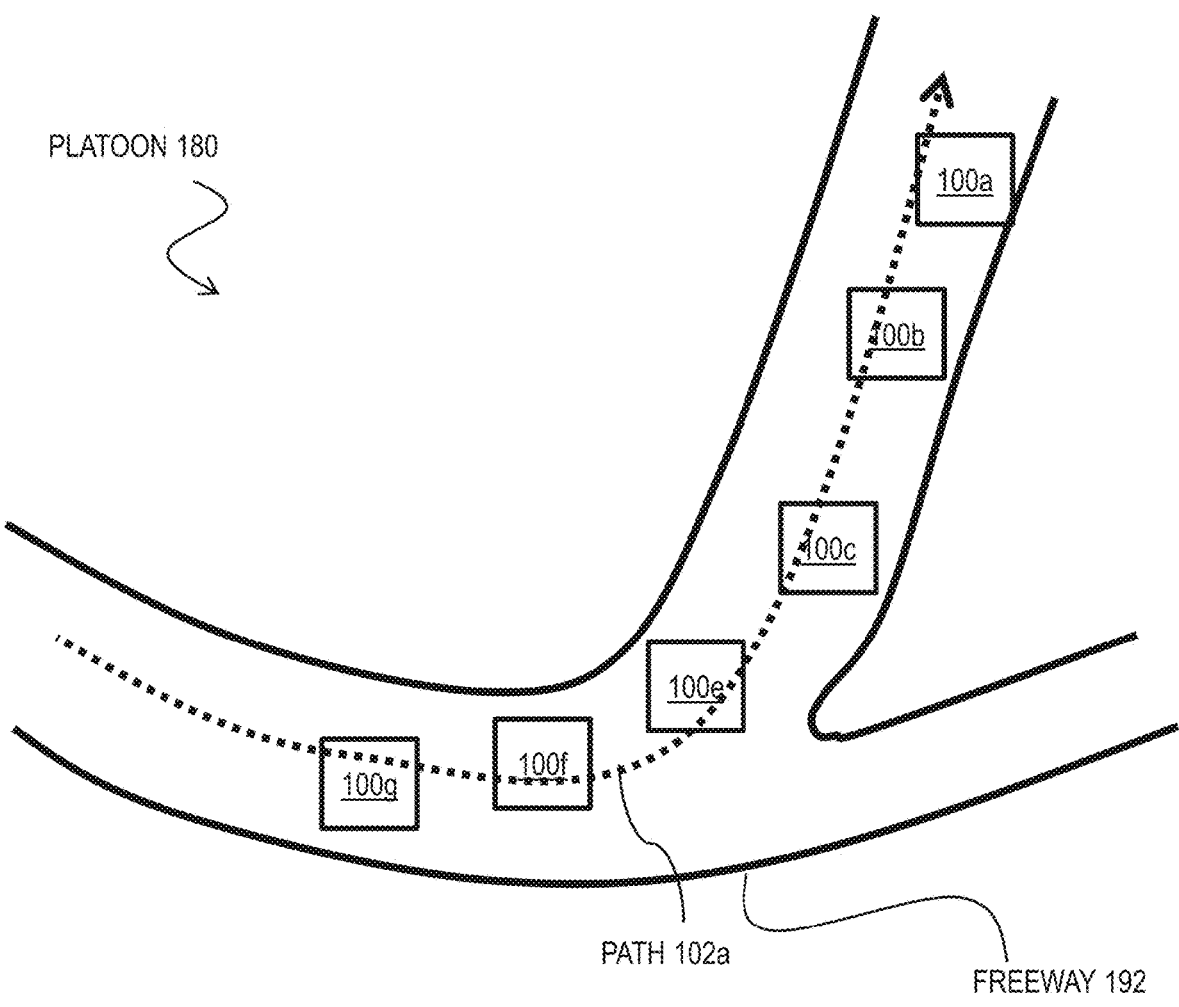

The steps of the method will now be discussed with respect to a vehicle node exiting the platoon during an exit maneuver. FIGS. 4A through 4C are block diagrams that illustrate an example of stages of an exit maneuver of a vehicle node 100*d* from the platoon 180 of FIG. 1B, according to an embodiment. In this embodiment, the method is discussed as performed by the mobile terminal 124 of the exiting vehicle node 100*d* during the exit maneuver of the vehicle node 100*d* from the platoon 180.

FIG. 5C is a flow diagram that illustrates an example of a method 550 performed by the mobile terminal 124 of the exiting vehicle node 100*d* in FIGS. 4A through 4C, according to an embodiment.

In a first step of the method 550, one or more parameters of the platoon 180 and the exiting vehicle node in the platoon 180 are stored in a data structure. In an embodiment, in step 551 an identifier of the platoon 180 and an identifier of the role of the exiting vehicle node in the platoon 180 is stored in a data structure. In one embodiment, in step 551 the mobile terminal 124 of the vehicle node 100*d* stores an identifier of the platoon 180 in the platoon ID field 214 of the current node subrecord 206*a* of the first record 201*a*. In another embodiment, in step 551 the mobile terminal 124 of the vehicle node 100*d* stores an identifier of the in-member member role of the vehicle node 100*d* in the node role field 216 of the current node subrecord 206*a*.

In a second step of the method 550, the exiting vehicle node transmits a data message to adjacent vehicle nodes in the platoon 180. In an embodiment, this transmitted data message is similar to the data messages transmitted at regular increments discussed in section 1.1. As shown in FIG. 4A, a predecessor vehicle node 100*c* and successor node 100*e* (relative to the exiting vehicle node 100*d*) are within the communication range 184 of the exiting vehicle node 100*d*. Thus, in this embodiment the adjacent vehicle nodes 100*c*, 100*e* will receive the data message transmitted by the exiting vehicle node 100*d*. In some embodiments, and additional step is implemented in addition to those that emerge from generic rules described below. In such an embodiment, in step 553 the mobile terminal 124 of the vehicle node 100*d* transmits a message to the adjacent vehicle nodes 100*c*, 100*e* with a plurality of data fields including a first data field indicating the identifier of the platoon 180 (stored in the platoon ID field 214) and a second data field indicating the in-member role of the vehicle node 100*d* within the platoon 180 (stored in the node role field 216).

In a third step of the method 550, the exiting vehicle node 100*d* exits the platoon 180. In one embodiment, in step 555 the mobile terminal 124 causes the vehicle node 100*d* to deviate from the path 102*a* of the platoon 180. In an example embodiment, in step 555 the mobile terminal 124 transmits a signal to the mobility component 110 of the vehicle node 100*d* to cause a deviation in the direction of travel of the vehicle node 100*d* from the path 102*a* of the platoon 180. In an example embodiment, as shown in FIG. 4B, the mobile terminal 124 transmits a signal to the mobility component 110 to cause the vehicle node 100*d* to take an exit off-ramp from the freeway 192 and thus deviate from the path 102*a* of the platoon 180.

In a fourth step of the method 550, the exiting vehicle node 100*d* updates its status based on exiting the platoon 180 in step 555. In an embodiment, in step 557 the mobile terminal 124 of the exiting vehicle node 100*d* updates one or more fields within the data structure 200 based on step 555. In an example embodiment, in step 557 the mobile terminal 124 modifies the platoon ID field 214 of the current node subrecord 206 from an identifier of the platoon 180 to a identifier that is different from the identifier of the platoon 180. In some embodiments, the mobile terminal 124 updates the value of the platoon ID field 214 to an identifier of a second platoon that is different from the platoon 180. In other embodiments, the mobile terminal 124 updates the value of the platoon ID field 214 with an absence of a platoon identifier. In an embodiment, in step 557 the mobile terminal 124 also modifies the value of the node role field

216 of the current node subrecord 206 from the in-member role before step 555 to a non-member role after step 555. In this embodiment, the non-member role value stored in the node role field 216 indicates that the vehicle node 100*d* is not a member of a platoon.

In a fifth step of the method 550, the vehicle node 100*d* transmits a data message with updated data fields based on step 557. In this embodiment, the transmitted data message updates the status of the vehicle node 100*d* to any vehicle node which is within the communication range 184 of the vehicle node 100*d* (e.g. vehicle node 100*c* in FIG. 4B). In some embodiments, and additional step is implemented in addition to those that emerge from generic rules described below. In such an embodiment, in step 559 the vehicle node 100*d* transmits a data message to the vehicle node 100*c* within the communication range 184 that includes a first data field indicating the updated platoon ID field 214 from step 557 and a second data field indicating the updated non-member role of the vehicle node 100*d*. In some embodiments, upon receiving this transmitted message, the vehicle node 100*c* within the platoon 180 determines that the value of the platoon ID field 214 in the first data field does not correspond to the stored platoon ID field 214 of the platoon 180 stored in the data structure 200 at the vehicle node 100*c*. Based on this assessment, the vehicle node 100*c* does not recognize the vehicle node 100*d* as within the platoon 180 (e.g. as a successor vehicle node to the vehicle node 100*c*).

1.4 Non-Exiting Vehicle Nodes

The steps of the method will now be discussed with respect to a non-exiting vehicle node of the platoon during the exit maneuver. In this embodiment, the method is discussed as performed by the mobile terminal 124 of the exiting vehicle nodes 100*c*, 100*e* during the exit maneuver of the vehicle node 100*d* from the platoon 180. FIG. 5D is a flow diagram that illustrates an example of a method 570 performed by the mobile terminal 124 of the non-exiting vehicle nodes 100*c*, 100*e* in FIGS. 4A through 4C, according to an embodiment.

In a first step of the method 570, one or more parameters of the platoon 180 and the vehicle node 100*c*, 100*e* in the platoon 180 are stored in a data structure. In an embodiment, in step 571 an identifier of the platoon 180 and an identifier of the in-member role of the vehicle node 100*c*, 100*e* in the platoon 180 is stored in a data structure. In one embodiment, in step 571 the mobile terminal 124 of the vehicle node 100*c*, 100*e* stores an identifier of the platoon 180 in the platoon ID field 214 of the current node subrecord 206*a* of the first record 201*a*. In another embodiment, in step 571 the mobile terminal 124 of the vehicle node 100*c*, 100*c* stores an identifier of the in-member member role of the vehicle node 100*c*, 100*e* in the node role field 216 of the current node subrecord 206*a*.

As shown in FIG. 4A, since the vehicle node 100*e* is within the communication range 184 of the exiting vehicle node 100*d*, at a first time increment the vehicle node 100*e* receives a data message from the exiting vehicle node 100*d*. In one embodiment, in step 572 at the first time increment the vehicle node 100*e* receives a first data message from the exiting vehicle node 100*d* that indicates one or more data fields (e.g., a current location of the vehicle node 100*d*, an identifier of the vehicle node 100*d*, an identifier of the platoon 180 and an in-member role of the vehicle node 100*d* within the platoon 180). In an example embodiment, the mobile terminal 124 of the vehicle node 100*e* stores this data in the fields 210, 212, 214, 216 of the predecessor node subrecord 202*a* of the first record 201*a* corresponding to the first time increment.

At each time increment, the vehicle node 100*e* measures its own current location using the positioning sensor 122 and stores this data in the data structure 200. In an embodiment, at the first time increment the mobile terminal 124 of the vehicle node 100*e* determines the current location of the vehicle node 100*e* from the positioning sensor 122 and stores this data in the position field 210 of the current node subrecord 206*a* of the first record 201*a*.

In one embodiment, in step 573 a first parameter value is determined based on the current location of the vehicle node 100*d* received in step 572 and the measured location of the vehicle node 100*e* at the first time increment. In an example embodiment, this first parameter value is determined based on equation 1 of step 503, where $$x_t^1$$

is the current location of the vehicle node 100*e* at the first time increment and $$x_r^1$$

is the current location of the vehicle node 100*d* at the first time increment.

In one embodiment, in step 574 at the second time increment the vehicle node 100*e* receives a second data message from the exiting vehicle node 100*d* that indicates one or more data fields (e.g., a current location of the vehicle node 100*d*, an identifier of the vehicle node 100*d*, an identifier of the platoon 180 and an in-member role of the vehicle node 100*d* within the platoon 180). In an example embodiment, the mobile terminal 124 of the vehicle node 100*e* stores this data in the fields 210, 212, 214, 216 of the predecessor node subrecord 202*b* of the second record 201*b* corresponding to the second time increment.

In one embodiment, in step 575 a second parameter value is determined based on the current location of the vehicle node 100*d* received in step 574 and the measured location of the vehicle node 100*e* at the second time increment. In an example embodiment, this second parameter value is determined based on equation 2 of step 507, where $$x_t^2$$

is the current location of the vehicle node 100*e* at the second time increment and $$x_r^2$$

is the current location of the vehicle node 100*d* at the second time increment.

In one embodiment, in step 576 a third parameter value is determined based on the first parameter value from step 573 and the second parameter value from step 575. In an example embodiment, this third parameter value is determined based on equation 3 of step 509, where $P_1$ is the first parameter value from step 573 and $P_2$ is the second parameter value from step 575.

In one embodiment, in step 577 the third parameter value from step 576 is compared with a threshold parameter value. In an example embodiment, the threshold parameter value is similar to the third parameter threshold value from step 513. In an example embodiment, if the comparison in step 577 indicates that the third parameter threshold value is less than the threshold parameter value, this confirms that the gap from the vehicle node 100*e* to the predecessor vehicle node is too high. In an example embodiment, this would occur based on the exiting vehicle node 100*d* leaving the platoon (FIG. 4B) and thus the gap from the vehicle node 100*e* to the new predecessor node 100*c* is too high (e.g. above the desired gap range). Thus, in some embodiments the comparison in step 577 is utilized to determine whether or not the preceding vehicle node has exited the platoon 180.

In step 578 of the method 570, the vehicle node 100*c* updates its status based on the vehicle node 100*d* exiting the platoon 180. In an embodiment, in step 578 the mobile terminal 124 of the vehicle node 100*e* updates one or more fields within the data structure 200 based on step 577. In an example embodiment, in step 578 the mobile terminal 124 modifies the value of the node role field 216 of the current node subrecord 206 from a first role (e.g. the in-member role of the vehicle node 100*e* prior to the vehicle node 100*d* exiting the platoon 180) to a second role different from the first role (e.g. the in-member role of the vehicle node 100*d* prior to exiting the platoon 180).

In step 578 of the method 570, the speed of the vehicle node 100*e* is controlled based on the comparison in step 577. In one embodiment, after the exiting vehicle 100*d* leaves the platoon 180, step 577 indicates that the third parameter value is less than the threshold parameter value which confirms that the gap from the vehicle node 100*e* to the new predecessor vehicle node 100*c* is too large (e.g. exceeds a desired gap range). Thus, in this embodiment, in step 578 the speed of the vehicle node 100*e* is increased to a speed that exceeds the speed of the vehicle node 100*c* so that the vehicle node 100*e* can catch up with the new predecessor node 100*c* (FIG. 4C) after the vehicle node 100*d* exited the platoon 180.

Although the above steps of the method 570 were discussed with respect to those steps performed by the vehicle node 100*e* in response to the exiting vehicle node 100*d* of FIGS. 4A through 4C, in other embodiments different steps would be taken by different vehicle nodes depending on which vehicle node exited the platoon. In one embodiments, the steps of the method 570 will now be discussed herein based on the tail member vehicle node 100*g* exiting the platoon 180. In this embodiment, the vehicle node 100*f* is performing the steps of the method 570. Steps 571 through 575 are performed by the mobile terminal 124 of the vehicle node 100*f* in a similar manner by the mobile terminal 124 of the vehicle node 100*e* as discussed above. However, unlike the mobile terminal 124 of the vehicle node 100*e*, which stored the received data from the vehicle node 100*d* in the predecessor node subrecord 202 in the data structure 200, the mobile terminal 124 of the vehicle node 100*f* will store the received data from the tail member vehicle node 100*g* in the successor node subrecord 204 of the data structure 200. Additionally, the third parameter determined in step 576 is based on a different equation than equation 3 in step 509:

$$SP_3 = 0.95 \times (P_1 + P_2) \tag{5}$$

where $SP_3$ is the third parameter value of a successor vehicle node. Thus, when the third parameter is determined for a successor vehicle node, equation 5 is used whereas when the third parameter $PP_3$ is determined for a predecessor vehicle node, equation 3 is used. In one embodiment, the third parameter value is determined based on a product of a ratio less than 1 and the sum of the first and second parameter values from steps 573 and 575. In an example embodiment, the ratio is greater (0.95) for the third parameter $SP_3$ for the successor vehicle node computation than the ratio (1/2) for the third parameter $PP_3$ for the predecessor vehicle node computation.

Additionally, in step 577 the third parameter threshold is about zero for the vehicle node 100f performing the method 570 after the tail member vehicle node 100g exits the platoon 180. In this embodiment, the comparison in step 577 indicates whether the value of the third parameter $SP_3$ in step 576 is about zero. In an example embodiment, once the tail member vehicle node 100g exits the platoon 180, the vehicle node 100f will continue to receive no data from a successor vehicle node since there is no vehicle node behind vehicle node 100f. Eventually, the third parameter value $SP_3$ in step 576 will be about zero and consequently the comparison in step 577 will then confirm that the successor vehicle node 100g that was behind the vehicle node 100f has left the platoon 180, leaving the vehicle node 100f as the new tail member node of the platoon 180. The inventors of the present invention selected the ratio (0.95) less than 1 in equation 5 to be relatively high and larger than the ratio (e.g. 1/2) in equation 3 in order to give sufficient time for a successor vehicle node to catch up with the vehicle node 100f before the vehicle node 100f designates itself as the new tail member vehicle node of the platoon 180. In these embodiments, in step 578 the mobile terminal 124 of the vehicle node 100f modifies the node role field 216 of the current node subrecord 202 to indicate the tail member role. In these embodiments, in step 579 the mobile terminal 124 controls the speed of the vehicle node 100f so to maintain a desired gap spacing with the predecessor vehicle node 100e (e.g. by performing steps 572 through 577 with respect to the vehicle nodes 100e, 100f). Steps 577 to 579 correspond to steps 515-523 in FIG. 5A.

In one embodiment, the steps of the method 570 will now be discussed herein based on the lead member vehicle node 100a exiting the platoon 180. In this embodiment, the vehicle node 100b is performing the steps of the method 570. Steps 571 through 575 are performed by the mobile terminal 124 of the vehicle node 100b in a similar manner by the mobile terminal 124 of the vehicle node 100e as discussed above.

Additionally, in step 577 the third parameter threshold is about zero for the vehicle node 100b performing the method 570 after the lead member vehicle node 100a exits the platoon 180. In this embodiment, the comparison in step 577 indicates whether the value of the third parameter in step 576 is about zero. In an example embodiment, once the lead member vehicle node 100a exits the platoon 180, the vehicle node 100b will continue to receive no data from a predecessor vehicle node since there is no vehicle node preceding the vehicle node 100b. Eventually, the third parameter value in step 576 will be about zero and consequently the comparison in step 577 will then confirm that the predecessor vehicle node 100a that was ahead of the vehicle node 100b has left the platoon 180, leaving the vehicle node 100b as the new lead member node of the platoon 180. In these embodiments, in step 578 the mobile terminal 124 of the vehicle node 100b modifies the node role field 216 of the current node subrecord 202 to indicate the lead member role. In these embodiments, in step 579 the mobile terminal 124 controls the speed of the vehicle node 100b to have a fixed speed. In an example embodiment, in step 579 upon determining that the value of the third parameter value is about zero, the mobile terminal 124 of the vehicle node 100b determines that the vehicle node 100b is the new lead role member and sets the speed of the vehicle node 100b to a fixed speed (e.g. equal to or less than a maximum speed limit on the freeway 192).

1.5 Emergent Rules

In an embodiment, the methods discussed above with respect to FIGS. 5A through 5D can be summarized by a plurality of emergent rules that are included in the platooning module 150. Based on the mobile terminal 124 of each vehicle node 100 following these rules in the platooning module 150, the join maneuver or exit maneuver previously discussed will "emerge". In this embodiment, there is no predetermination that a vehicle node will join or exit the platoon after which a certain set of steps are followed. Instead, by each vehicle node abiding by these emergent rules, the steps that facilitate the exit or join maneuver emerge and are performed by the relevant vehicle nodes.

R1: $0 \leq PP_3 \leq$ Third paramter threshold$\rightarrow$Accelerate

R2: Lower threshold$\leq PP_3 \leq$Upper threshold$\rightarrow$Maintain Speed

R3: $SP_3 = 0 \rightarrow$Become Tail Member

R4: $PP_3 >$Third paramter threshold$\rightarrow$Decelerate

R5: $PP_3 = 0 \rightarrow$Change controller to ACC

The first rule (R1) provides that the vehicle node should accelerate when the value of the third parameter $PP_3$ of the preceding vehicle node is less than our equal to the third parameter threshold. This indicates that the gap to the preceding vehicle node is greater than a desired gap and thus accelerating the vehicle node is performed to catch up with the preceding vehicle node.

The second rule (R2) provides that if the value of the third parameter $PP_3$ of the preceding vehicle node is within a desired range, then the vehicle node should maintain its speed. This indicates that the gap to the preceding vehicle node is within a desired gap range and thus maintaining the speed of the vehicle is performed to maintain this desired gap range.

The third rule (R3) provides that if the value of the third parameter $SP_3$ of the successor vehicle node reaches zero, then the vehicle node becomes the new tail member. Based on equation 5, this means that the first and second parameter values have approached zero over time since no successor vehicle node has been detected over time behind the vehicle node. Hence, it can be assumed that no vehicle node is behind the vehicle node and thus the vehicle node becomes the new tail member node.

The fourth rule (R4) provides that the vehicle node should decelerate when the value of the third parameter $PP_3$ of the preceding vehicle node is greater than the third parameter threshold. This indicates that the gap to the preceding vehicle node is less than a desired gap and thus decelerating the vehicle node is performed to increase the gap with the preceding vehicle node.

The fifth rule (R5) provides that if the value of the third parameter $PP_3$ of the predecessor vehicle node reaches zero, then the vehicle node becomes the new lead member and switches to cruise control (ACC). Based on equation 3, this means that the first and second parameter values have approached zero over time since no predecessor vehicle node has been detected over time ahead of the vehicle node. Hence, it can be assumed that no vehicle node is ahead of the vehicle node and thus the vehicle node becomes the new lead member node.

Although five rules are listed above, the rules used to perform one or more of the methods disclosed herein may include less or more than these five rules. In other embodiments, none of these rules may be used in performing one or more steps of the methods disclosed herein.

One embodiment of a method that is performed by mobile terminal of one or more vehicle nodes based on at least some of these emergent rules will now be discussed herein. FIG. 5E is a flow diagram that illustrates an example of a method 590 performed by the mobile terminal of the vehicle nodes in FIG. 1B, according to an embodiment. In an embodiment, in a first step 581 the mobile terminal 124 of the first vehicle node 100 in the platoon 180 receives first data from a predecessor vehicle node (e.g. vehicle node 100d relative to vehicle node 100c) in the platoon 180 that indicates the location of the predecessor vehicle node over first and second time increments. In one embodiment, step 581 is similar to steps 501 and 505 of the method 500 with respect to the predecessor vehicle node.

In an embodiment, in a second step 582 the mobile terminal 124 of the first vehicle node 100 in the platoon 180 receives second data from a successor vehicle node (e.g. vehicle node 100f relative to vehicle node 100e) in the platoon 180 that indicates the location of the predecessor vehicle node over the first and second time increments. In one embodiment, step 582 is similar to steps 501 and 505 of the method 500 with respect to the successor vehicle node.

In an embodiment, in a third step 583 the mobile terminal 124 of the first vehicle node 100 in the platoon 180 receives third data that the location of the first vehicle node 100 over the first and second time increments. In one embodiment, the mobile terminal 124 of the first vehicle node 100 receives the third data from the positioning sensor 122 of the first vehicle node 100 at the first and second time increments.

In an embodiment, in a fourth step 584 the mobile terminal 124 of the first vehicle node 100 in the platoon 180 stores a first role of the first vehicle node 100d in a data structure. In one embodiment, in the fourth step 584 the mobile terminal 124 stores a first role (e.g. in-member role) of the first vehicle node 100 in the node role field 216 of the current node subrecord 206.

In an embodiment, in a fifth step 585 the mobile terminal 124 of the first vehicle node 100 determines a value of a predecessor parameter based on the first data from step 581 and the third data from step 583. In one embodiment, the value of the predecessor parameter is similar to the third parameter from equation 3 of step 509 and is determined in a similar manner as equations 1-3 from steps 503, 507 and 509.

In an embodiment, in a sixth step 586 the mobile terminal 124 of the first vehicle node 100 determines a value of a successor parameter based on the second data from step 582 and the third data from step 583. In one embodiment, the value of the predecessor parameter is similar to the third parameter from equation 5 of step 576 and is determined in a similar manner as equations 1-2 and 5 from steps 573, 575 and 576.

In an embodiment, in a seventh step 587 the mobile terminal 124 of the first vehicle node 100 compares the value of the predecessor parameter from step 585 with a first threshold value. In one example embodiment, the first threshold value is similar to the third parameter threshold value from step 513. In an example embodiment, step 587 encompasses rules R1, R2 and R4. In one example embodiment, rule R1 is enacted when the step 587 comparison results in the value of the predecessor parameter being less than the first threshold value. In one example embodiment, rule R2 is enacted when the step 587 comparison results in the value of the predecessor parameter being equal to the first threshold value and/or within a range of first threshold values (e.g. between a lower threshold value and an upper threshold value). In this example embodiment, the range of first threshold values are based on a range of desired gap spacings between adjacent vehicle nodes (e.g. an inverse of this range of desired gap spacings). In one example embodiment, rule R4 is enacted when the step 587 comparison results in the value of the predecessor parameter being greater than the first threshold value.

In an embodiment, in an eighth step 588 the mobile terminal 124 of the first vehicle node 100 controls the speed of the first vehicle node 100 based on step 587. In one embodiment, where rule R1 is enacted, the mobile terminal 124 increases the speed of the first vehicle node 100 (e.g. transmits a signal to the mobility component 110 to increase the speed). In one embodiment, where rule R2 is enacted, the mobile terminal 124 maintains the speed of the first vehicle node 100 (e.g. transmits a signal to the mobility component 110 to maintain the speed). In one embodiment, where rule R4 is enacted, the mobile terminal 124 decreases the speed of the first vehicle node 100 (e.g. transmits a signal to the mobility component 110 to reduce the speed).

In an embodiment, in a ninth step 589 the mobile terminal 124 of the first vehicle node 100 compares the value of the successor parameter from step 586 with a second threshold value. In one example embodiment, the second threshold value is similar to the third parameter threshold value from step 577. In an example embodiment, the second threshold value is zero. In an example embodiment, step 589 encompasses rules R3 and R5. In one example embodiment, rule R3 is enacted when the ninth step 589 comparison results in the value of the successor parameter being about equal to the second threshold value. In one example embodiment, rule R5 is enacted when the ninth step 589 comparison results in the value of the predecessor parameter being about equal to the second threshold value.

In an embodiment, in a tenth step 591 the mobile terminal 124 of the first vehicle node 100 changes the role of the first vehicle node stored in the data structure in step 584. In one embodiment, in step 591 the mobile terminal 124 changes the first role of the vehicle node 100 stored in the node role field 216 of the current node subrecord 206 to a second role that is different from the first role. In one embodiment, where rule R3 is enacted, the mobile terminal 124 modifies the first role (e.g. in-member role) of the first vehicle node 100 stored in the node role field 216 of the current node subrecord 206 to a tail member role. In one embodiment, where rule R5 is enacted, the mobile terminal 124 modifies the first role (e.g. in-member role) of the first vehicle node 100 stored in the node role field 216 of the current node subrecord 206 to a lead member role. Steps 589 to 591 correspond to steps 515-523 in FIG. 5A.

In an embodiment, as a result of the mobile terminal 124 of each vehicle node 100 within the platoon 180 following this method 590, the join or exit maneuvers will naturally "emerge" without the need of each of the vehicle nodes 100 to follow some separate "join" or "exit" protocol.

2. Example Embodiments

In an example embodiment, in step 521 or 523, the mobile terminal 124 of the vehicle node 100 determines the respective rate of deceleration (step 521) or acceleration (step 523) of the vehicle node 100 using speed, distance and acceleration of other vehicles that it senses on its own (e.g., Adaptive Cruise Control) or by receiving them explicitly via wireless communication (e.g., CACC) to maintain desired inter-vehicle spacing. In autonomous platooning, there are two types of inter-vehicle spacing policies used-Constant Distance Spacing (CDS) and Constant Time Spacing (CTS). With CDS, all vehicles use speed and acceleration information from the lead vehicle of the platoon to maintain string stability. This restriction does not apply to the CTS policy and the spacing depends on the velocity of the controlled vehicle. While CDS can achieve shorter inter-vehicle spacing compared to CTS, it cannot be used in decentralized platooning since it is inherently centralized as it needs information from the lead vehicle. Therefore, for the decentralized, emergent platooning approach disclosed herein, the mobile terminal 124 is used which possesses both internal-and string stability properties. Information flow in the system is shown in FIG. 1C, where the predecessor and successor of vehicle; are vehicle$_{i-1}$ and vehicle$_{i+1}$, respectively. The desired acceleration of each vehicle; is determined using information from its predecessor according to Equation 6, where controller parameters are summarized in Table 1.

TABLE 1

| Parameter | Description |
|---|---|
| $k_p$, $k_d$, $k_{dd}$ | Constants |
| $e_{1,i}$, $e_{2,i}$, $e_{3,i}$ | Space, Speed, Acceleration Errors |
| $V_i$ | Vehicle i |
| $u_i$ | Acceleration of Vi |
| $d_{r,i}$ | Inter-vehicle spacing |
| $d_i$ | Gap between Vi, Vi-1 |
| $s_i$, $v_i$, $a_i$, $L_i$ | Position, Speed, Acc, Length of Vi |
| r | Standstill distance between vehicles |
| h | Desired time headway |
| $\tau$ | Engine dynamics time constant |

$$u_i = \frac{1}{h}\left(-u_i + k_p e_{1,i} + \dot{k}_d e_{2,i} + k_{dd} e_{3,i} + u_{i-1}\right) \quad (6)$$

where, $$e_{1,i} = d_i - d_{r,i} = (s_{i-1} - s_i - L_i) - (r + hv_i) \quad (7)$$

$$e_{2,i} = v_{i-1} - v_i - ha_i$$

$$e_{3,i} = a_{i-1} - a_i - h\dot{a}_i$$

$$\dot{a}_i = \frac{1}{\tau}(-a_i + u_i)$$

In this example embodiment, it is presumed that each vehicle node 100 uses the same mobile terminal 124 and thus the values of r and h are independent of i. For any value h>0, the errors in equation 7 can be stabilized with values of $k_p$, $k_d$>0 and $k_{dd}$>−1 such that $(1+k_{dd})k_d$>$k_p$.

The novel emergent platooning system is evaluated by comparing the performance of the controller (e.g. mobile terminal 124 with the platooning module 150) against centralized platooning. These experiments were conducted using the PLEXE 2.1 simulator, which in turn uses SUMO for simulating vehicular traffic, and OMNeT++ for simulating the communication network. The emergent platooning method was implemented on PLEXE 2.1. The evaluation uses PLEXE 2.1's default simulation parameters. Table 2 summarizes the simulation parameters:

TABLE 2

| Parameter | Value |
|---|---|
| TX pwr (centralized) | 20 dBm |
| TX pwr (emergent) Epoch ($\delta t$) | 10 dBm 0.1 s |
| Platoon size | 20 vehicles |
| Desired gap | 15 m |
| MAXBOFF | 3 s |
| h | 0.5 s |
| $L_i$ | 4 m |
| r | 2 m |
| $k_p$, $k_d$, $k_{dd}$ | 0.2, 0.7, 0 |
| $\tau$ | 0.5 s |

Only those new parameters are listed in Table 2 whose values are different from PLEXE's 2.1 default parameters.

Different performance metrics were utilized in the simulation. In one example, spacing error was utilized to evaluate controller performance and maneuver latency, i.e., the time a vehicle stays in the maneuvering state, to evaluate the performance of our emergent platooning approach. For the joining maneuver, latency is given by the total time from when a joining vehicle node enters the simulation until it becomes a part of the platoon. For the exiting maneuver, it is the total time from when a vehicle decides to exit the platoon till it disassociates itself from the platoon. In the current implementation of the method, message loss is handled by having the joining vehicle node and tail member vehicle node abort the maneuver if they do not hear from one another within a specified time interval and retry the maneuver subsequently. More advanced reliability mechanisms will be considered in other embodiments.

The type of simulation experiments that were employed are now discussed. Once a simulation run starts, every 2 seconds a new vehicle enters the scene until a total of twenty vehicles are present. All vehicle nodes enter the system in Adaptive Cruise Control (ACC) mode and move to Cooperative Adaptive Cruise Control (CACC) mode after joining the platoon, except for the first vehicle node of the platoon which continues to be in ACC mode. In emergent platooning, vehicle nodes will start as a tail member role. In centralized platooning, the first vehicle node in the experiment assumes the role of the leader and coordinates the maneuvering of all the remaining vehicle nodes that join the platoon one after the other. The vehicle node closest to the leader in case of centralized platooning and the one closest to the tail-member in case of emergent platooning will be allowed to join.

Figure 6A:
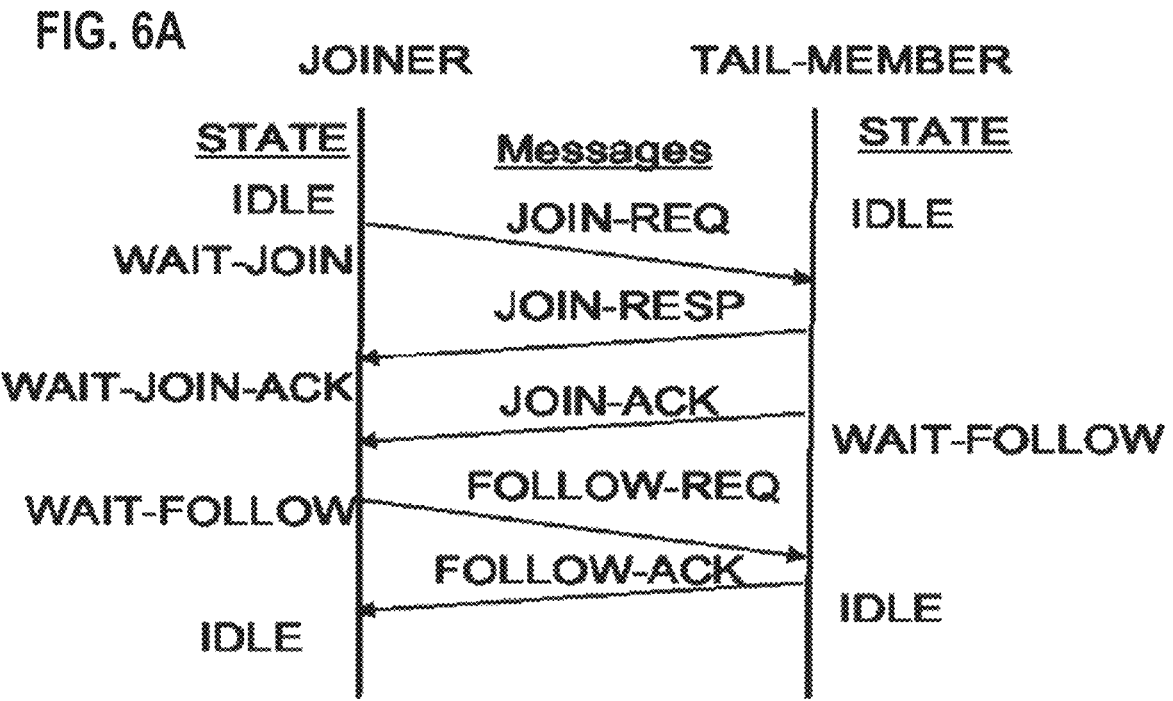
FIG. 6A is an image that illustrates an example of data exchange between the joining vehicle node and tail member vehicle node in FIGS. 3A through 3C, according to an embodiment.

FIG. 6A is an image that illustrates an example of data exchange between the joining vehicle node and tail member vehicle node in FIGS. 3A through 3C, according to an embodiment. In an embodiment, proximity is determined by the vehicle node's position information contained in the JOIN-REQ signal. In one embodiment, using negative JOIN-RESP messages, the leader or the TAIL-MEMBER coordinating the maneuver will reject requests from the vehicles that are not close enough or if they are coordinating another maneuver. To simulate worst case Exit behavior, all but the first and the tail vehicles decide to exit the platoon simultaneously, once all the vehicles have joined the platoon and the platoon has remained in steady state for a few seconds. All experiments were run 5 times with different random seeds and results were reported.

Figure 7A:
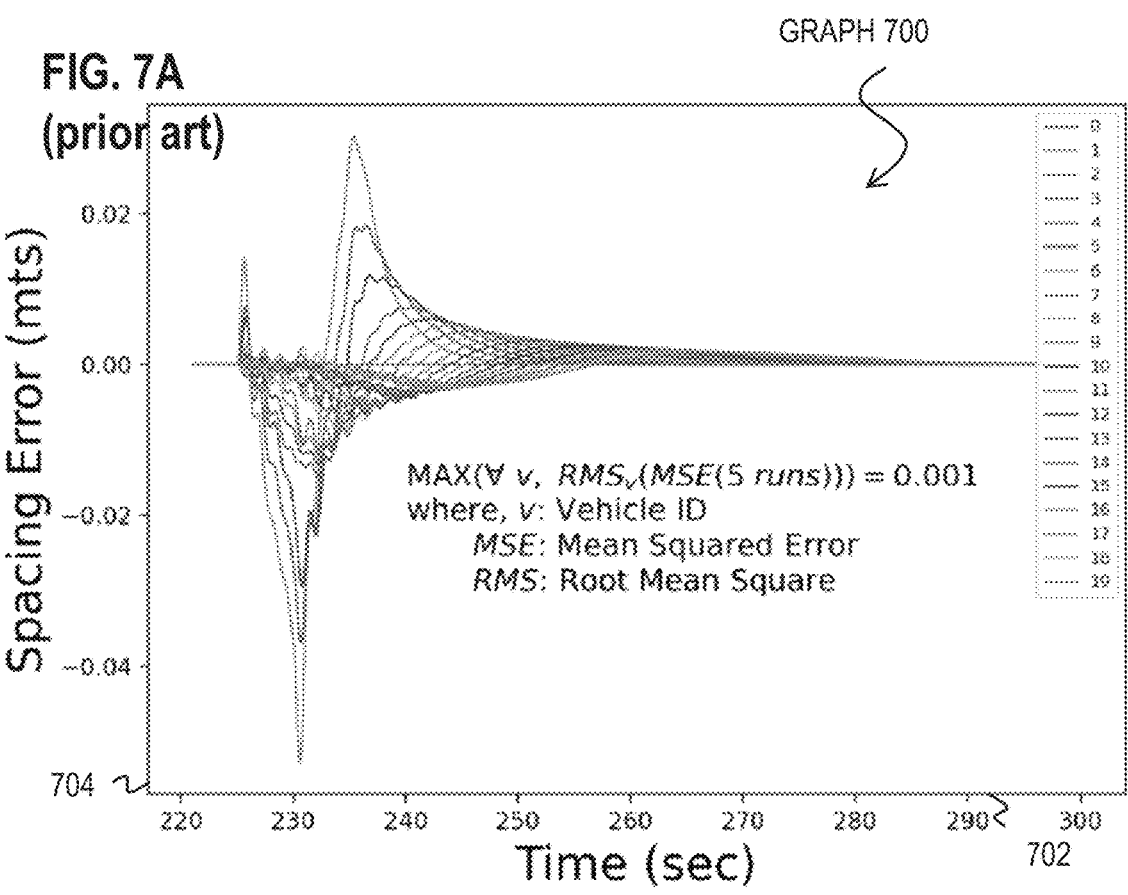
FIG. 7A is a graph that illustrates an example of spacing error between adjacent vehicle nodes during platoon maneuvering according to a conventional platooning method.
Figure 7B:
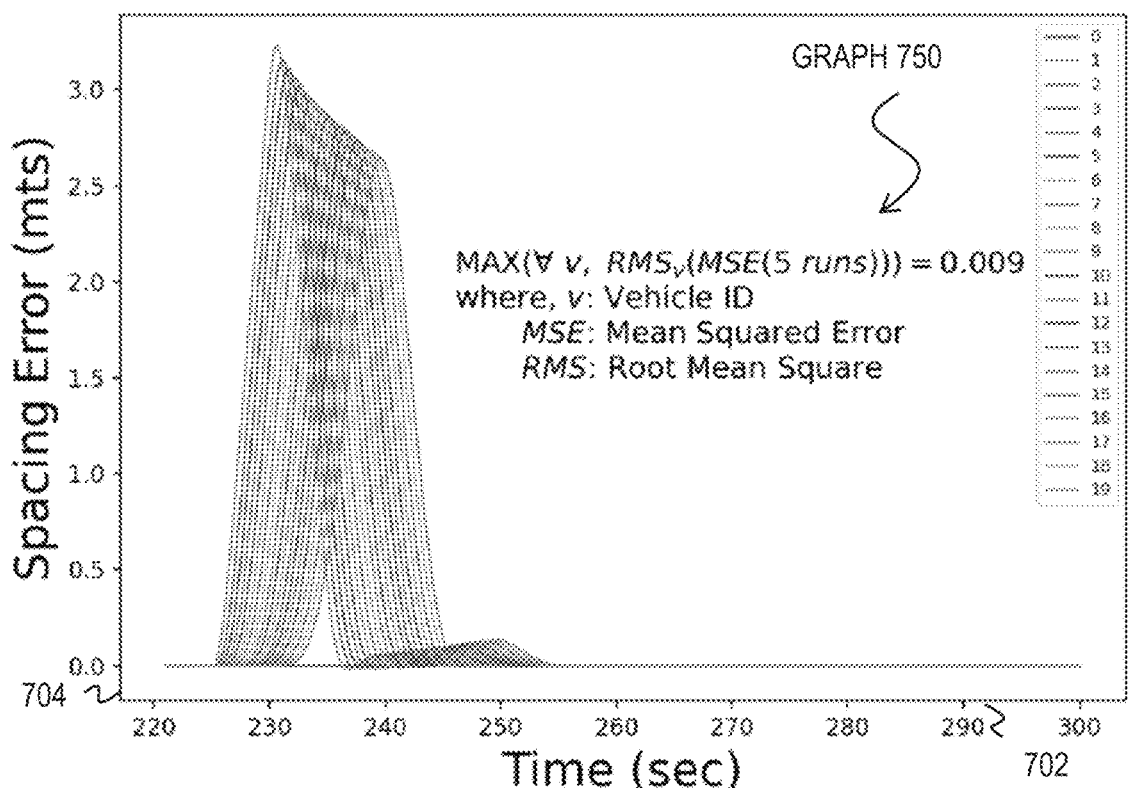
FIG. 7B is a graph that illustrates an example of spacing error between vehicle nodes during platoon maneuvering, according to an embodiment.
Figure 8A:
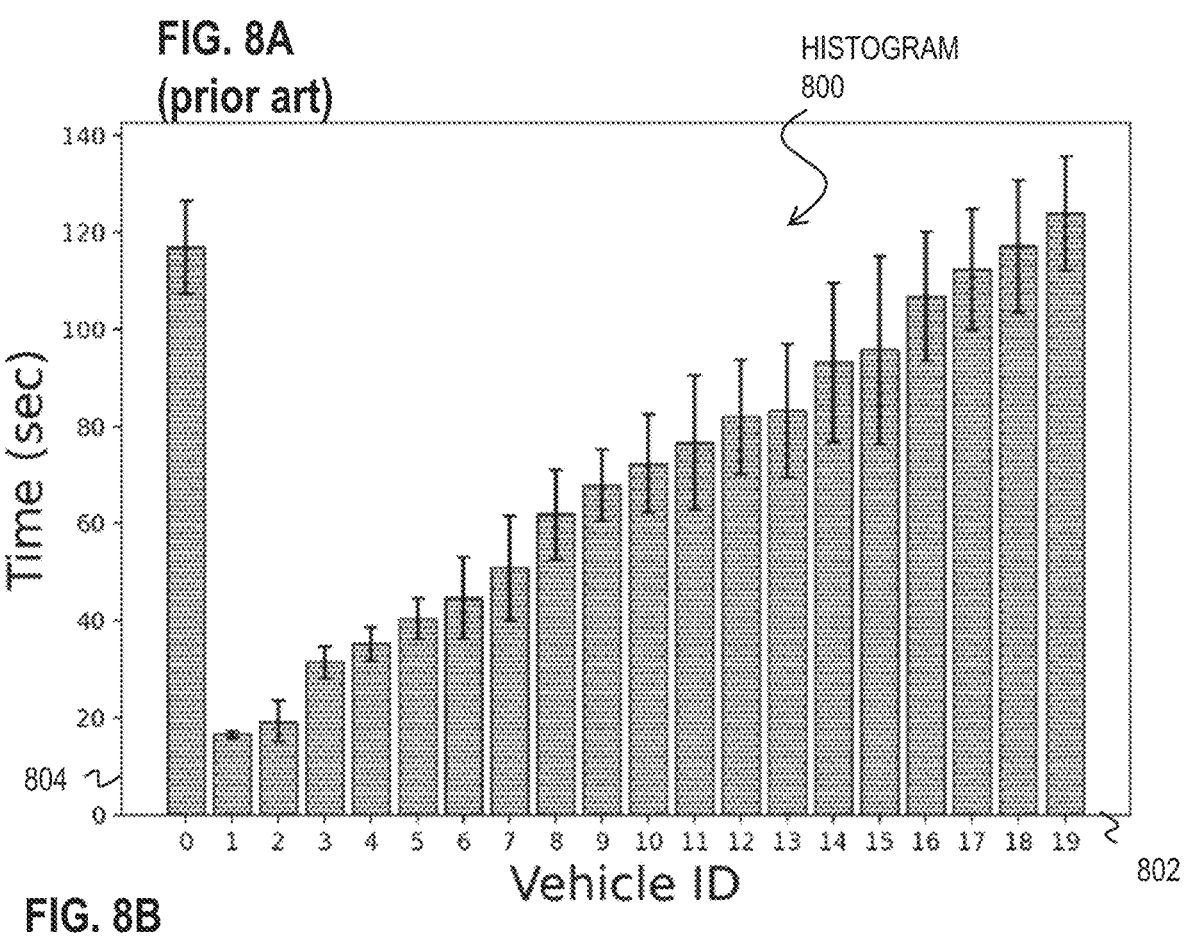
FIG. 8A is a graph that illustrates an example of an average time to complete a join maneuver of different vehicle nodes in a platoon according to a conventional platooning method.
Figure 8B:
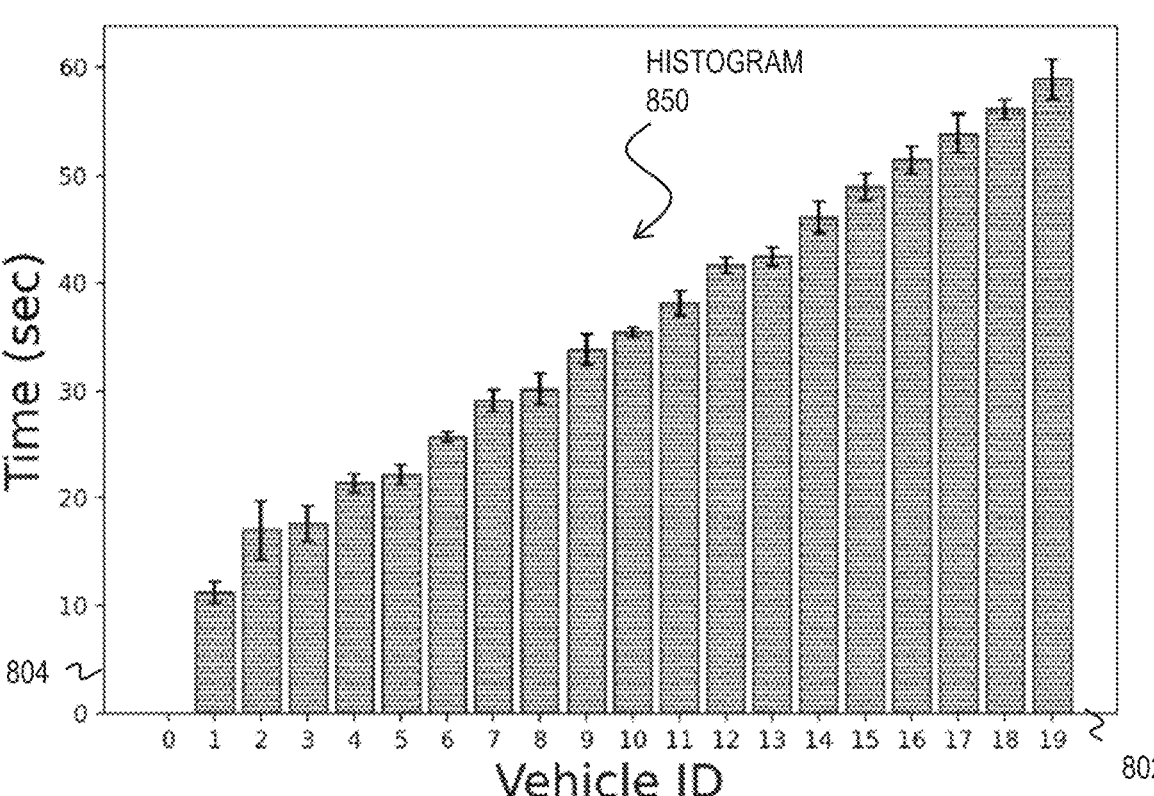
FIG. 8B is a graph that illustrates an example of an average time to complete a join maneuver of different vehicle nodes in a platoon, according to an embodiment.

FIG. 7A is a graph 700 that illustrates an example of spacing error between adjacent vehicle nodes during platoon maneuvering according to a conventional platooning method. FIG. 7B is a graph 750 that illustrates an example of spacing error between vehicle nodes during platoon maneuvering, according to an embodiment. The horizontal axis 702 is time in units of seconds and the vertical axis 704 is spacing error in units of metre-tonne-seconds (mts). FIG. 8A is a histogram 800 that illustrates an example of an average time to complete a join maneuver of different vehicle nodes in a platoon according to a conventional platooning method. FIG. 8B is a histogram 850 that illustrates an example of an average time to complete a join maneuver of different vehicle nodes in a platoon, according to an embodiment. The horizontal axis 802 is vehicle identifier of vehicle nodes in the platoon and the vertical axis 804 is time in units of seconds. Averages over the 5 runs including maximum mean error (FIGS. 7A-7B) and standard deviation (FIGS. 8A-8B). FIG. 7A depicts spacing error with the controller of the conventional method and FIG. 7B depicts spacing error of the controller used with the method of the present invention herein.

Performance of the controller used in the embodiments disclosed herein was compared with the controller used in centralized platooning. The resulting spacing error is evaluated after causing a "disturbance" in the system. In these experiments, after the platoon is formed, a disturbance is introduced at time t=225 s by having the leader accelerate to 125 kmh and then decelerate back to its original speed of 100 kmh after 5 s.

The headway (h) for the controller of the method disclosed herein, which uses constant-time spacing, is set to 0.5 s, the minimum necessary headway for string stability given that the data messages are transmitted every 100 ms. The equivalent desired gap for the controller used in centralized platooning, which uses constant-distance spacing policy, is (15 m). FIGS. 7A and 7B shows the spacing error (in meters) experienced by the different vehicles in the platoon over time after the disturbance is introduced, where a positive or a negative value means that the spacing is higher or lower than the desired spacing, respectively. FIGS. 7A and 7B indicate that the spacing error decreases towards the tail of the platoon for both controllers, which demonstrates that the platoon is string stable. Note that in the case of the controller used in the present invention (FIG. 7B), the vehicles towards the tail end of the platoon show a maximum gap of 3 m, almost 100× higher than the spacing errors in the case of the conventional controller (FIG. 7A). This is because, in the improved emergent platooning system disclosed herein, each vehicle relies only on the information from its predecessor, whereas under the conventional centralized platooning, all vehicles have access to the leader's information that enables faster convergence. The spacing does not fall below 0.05 m and 0.01 m from the desired spacing in the conventional controller and improved controller, respectively. This means that the vehicles were never at the risk of colliding. However, the desired spacing is reached almost 3× faster after disturbance is introduced in the improved controller (30 s), compared to the conventional controller (80 s). In other embodiments, the controller could use information from two predecessors which have been shown to result in smaller headway.

Figure 6B:
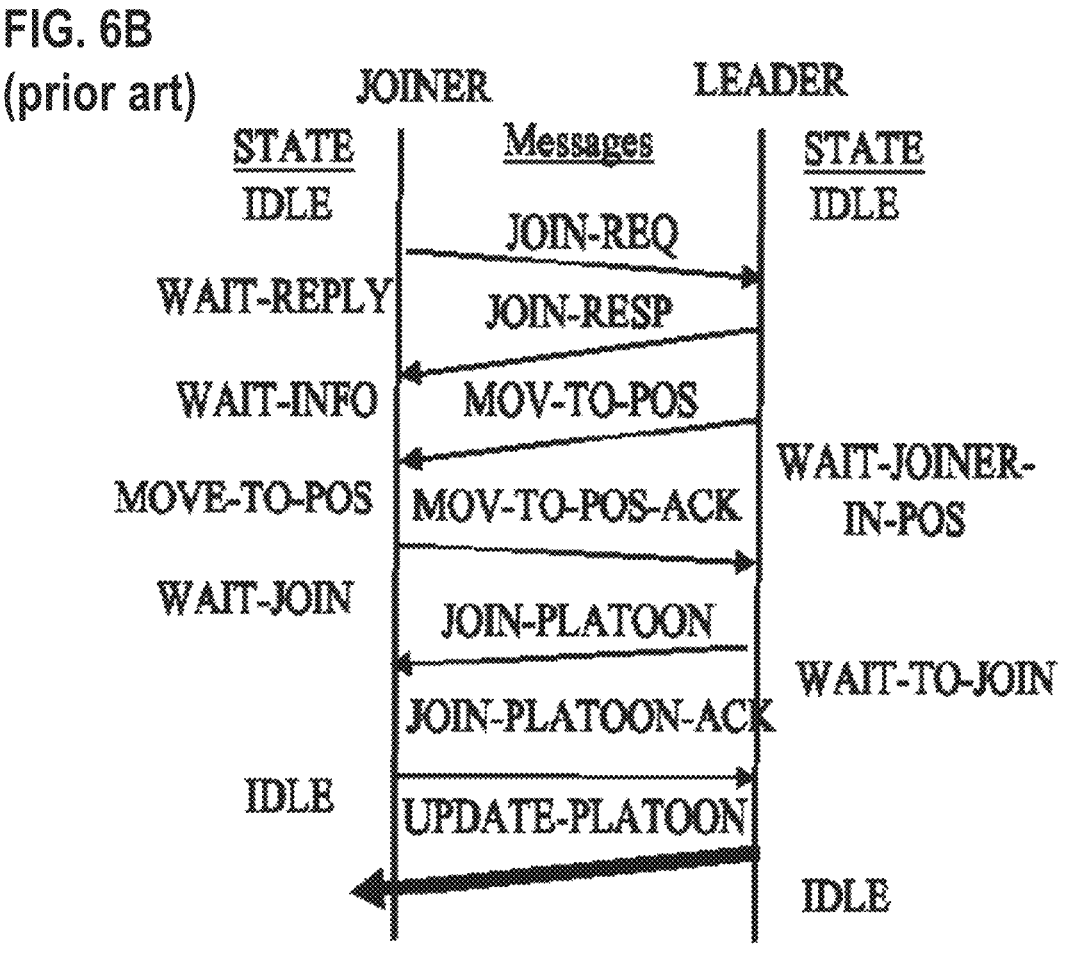
FIG. 6B is an image that illustrates an example of data exchange between a joining vehicle node and lead member vehicle node in a conventional platooning method.

FIG. 6B shows the message exchange during Join maneuvers in the centralized approach. Joining vehicles enter the maneuvering state as soon as they enter the system and remain in that state until they are let into the platoon by the leader. As such, as shown in FIG. 8A the vehicle 19, which is the last to enter the experiment and thus, the platoon, spends the longest time (124.03 s) in Join maneuvering state. The leader, vehicle 0, will be coordinating only one vehicle at a time and join requests from any other vehicle will be rejected. Vehicles requesting to join the platoon backoff for a random interval (0<backoff<MAXBOFF) before retrying. While lower MAXBOFF leads to higher retries, MAXBOFF that are too long result in higher maneuvering latency. In an example embodiment, MAXBOFF=3 s. The leader remained in maneuvering state for a total of 117.03 s. When MAXBOFF was increased, the time the leader remained in maneuvering state decreased. For example, for MAX-BOFF=20 s, vehicle 19 experienced higher Join maneuvering latency (216.45 s), but the leader maneuvering time decreased to 62.42 s. This is because JOINERS waited longer to retry joining after their requests were rejected.

In emergent platooning of the embodiments of the present invention disclosed herein, each vehicle (except the first and the tail) will be in the Join maneuvering state twice, once as JOINER and later as TAIL-MEMBER, which coordinates the maneuver. The average amount of time the TAIL-MEMBER spent coordinating the maneuver is just 3.8 ms compared to 117.03 s spent by the leader in the centralized approach. This discrepancy is due to the fact that in centralized platooning, the leader has to coordinate all maneuvers, while in emergent platooning the coordination is localized between the current TAIL-MEMBER and the JOINER. According to FIG. 8B, the time to complete all Joins in the emergent system is 58.85 s, which represents a 50% reduction compared to centralized platooning. This reduction is due to the absence of serialization and the backoff during the maneuver. Backoff was not required in emergent platooning as the vehicles use lower power for communicating with immediate neighbors compared to centralized platooning that leads to lower signal interference.

Figure 6C:
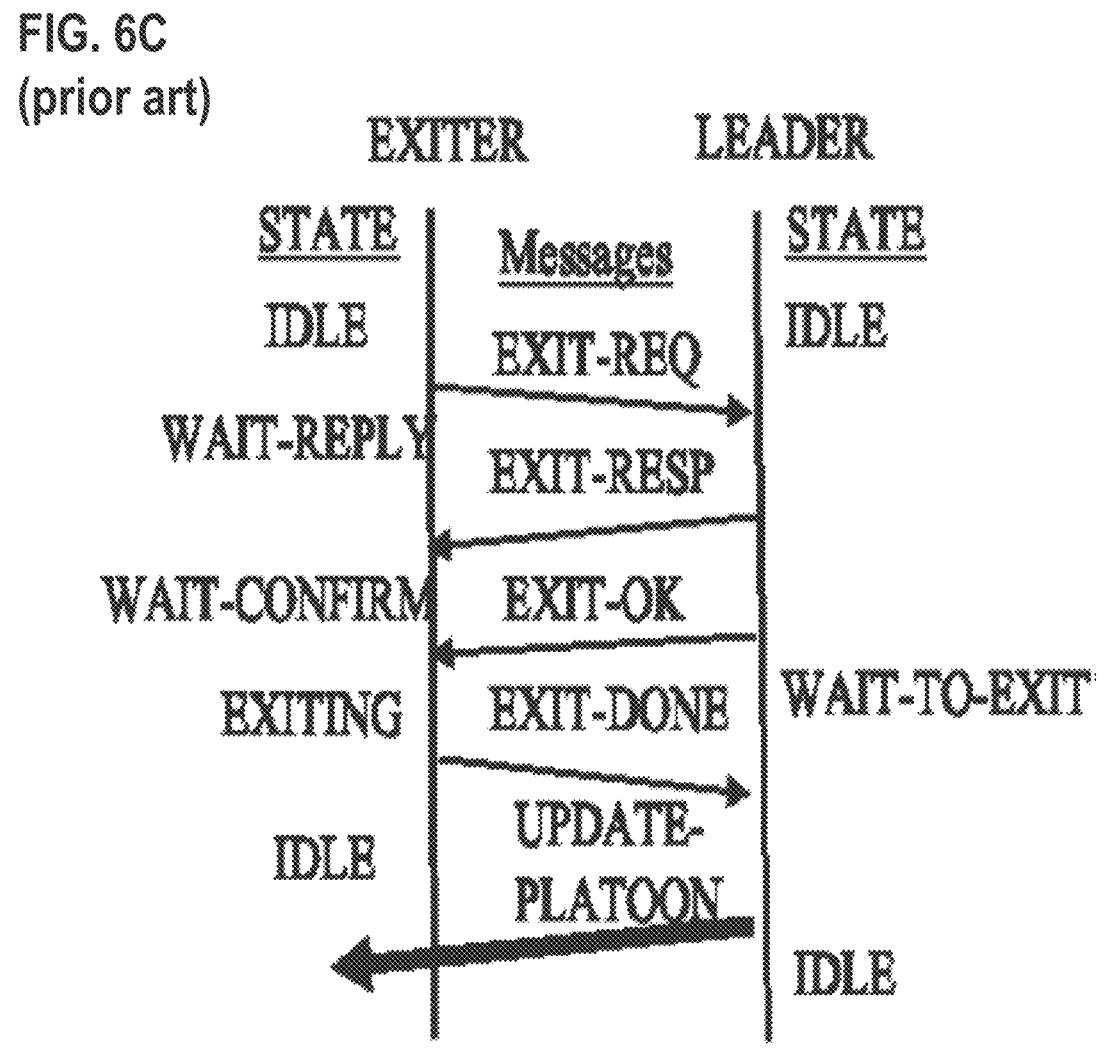

Prior work has focused mostly on single vehicle exits. However, since in real-world scenarios, multiple vehicles can exit a platoon simultaneously, the implementation of the system and method disclosed herein is able to handle both single- and multi-vehicle exits. The message exchange between the exiter and the leader in centralized platooning is shown in Figure FIG. 6C. The leader has to serially coordinate the exit of each vehicle. Therefore, the average time each vehicle has to wait before it exits the platoon is higher. In the example embodiments of the present invention disclosed herein, the tail vehicle had to wait for approximately 2.5 s, while the leader was in maneuvering state for a few milliseconds for each vehicle. In emergent platooning, the exiting vehicle need not inform any vehicle and consequently, there are no messages exchanged and exits are "instantaneous". The tail vehicle's third parameter value reduces due to the absence of its predecessor, which causes it to accelerate to catch-up until it senses a data message from the first vehicle after all vehicles exit. At that point, it coordinates with the first vehicle to complete platoon consolidation.

In the description disclosed herein, a novel emergent-behavior based decentralized platooning framework is disclosed. Preliminary complexity and latency results for the Join and Exit maneuvers indicate that this platooning approach is a promising alternative to centralized platooning. It was demonstrated experimentally that this improved emergent platooning achieves string-stability after disturbance and is able to achieve the desired intervehicular spacing faster (e.g., after a disturbance). In other embodiments, the improved emergent platooning can be further improved to reduce spacing error caused by disturbances as well as implement additional maneuvers.

3. Hardware Overview

FIG. 9 is a block diagram that illustrates a computer system 900 upon which an embodiment of the invention may be implemented. Computer system 900 includes a communication mechanism such as a bus 910 for passing information between other internal and external components of the computer system 900. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of one or more methods described herein.

A sequence of binary digits constitutes digital data that is used to represent a number or code for a character. A bus 910 includes many parallel conductors of information so that information is transferred quickly among devices coupled to the bus 910. One or more processors 902 for processing information are coupled with the bus 910. A processor 902 performs a set of operations on information. The set of operations include bringing information in from the bus 910 and placing information on the bus 910. The set of operations also typically include comparing two or more units of information, shifting positions of units of information, and combining two or more units of information, such as by addition or multiplication. A sequence of operations to be executed by the processor 902 constitutes computer instructions.

Computer system 900 also includes a memory 904 coupled to bus 910. The memory 904, such as a random access memory (RAM) or other dynamic storage device, stores information including computer instructions. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of computer instructions. The computer system 900 also includes a read only memory (ROM) 906 or other static storage device coupled to the bus 910 for storing static information, including instructions, that is not changed by the computer system 900. Also coupled to bus 910 is a non-volatile (persistent) storage device 908, such as a magnetic disk or optical disk, for storing information, including instructions, that persists even when the computer system 900 is turned off or otherwise loses power.

Information, including instructions, is provided to the bus 910 for use by the processor from an external input device 912, such as a keyboard containing alphanumeric keys operated by a human user, or a sensor. A sensor detects conditions in its vicinity and transforms those detections into signals compatible with the signals used to represent information in computer system 900. Other external devices coupled to bus 910, used primarily for interacting with humans, include a display device 914, such as a cathode ray tube (CRT) or a liquid crystal display (LCD), for presenting images, and a pointing device 916, such as a mouse or a trackball or cursor direction keys, for controlling a position of a small cursor image presented on the display 914 and issuing commands associated with graphical elements presented on the display 914.

In the illustrated embodiment, special purpose hardware, such as an application specific integrated circuit (IC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 970 sends and receives electrical, acoustic or electromagnetic signals, including infrared and optical signals, that carry information streams, such as digital data.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 902, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 902, except for carrier waves and other signals.

Logic encoded in one or more tangible media includes one or both of processor instructions on a computer-readable storage media and special purpose hardware, such as ASIC *920**.

Network link 978 typically provides information communication through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990. A computer called a server 992 connected to the Internet provides a service in response to information received over the Internet. For example, server 992 provides information representing video data for presentation at display 914.

The invention is related to the use of computer system 900 for implementing the techniques described herein. According to one embodiment of the invention, those techniques are performed by computer system 900 in response to processor 902 executing one or more sequences of one or more instructions contained in memory 904. Such instructions, also called software and program code, may be read into memory 904 from another computer-readable medium such as storage device 908. Execution of the sequences of instructions contained in memory 904 causes processor 902 to perform the method steps described herein. In alternative embodiments, hardware, such as application specific integrated circuit 920, may be used in place of or in combination with software to implement the invention. Thus, embodiments of the invention are not limited to any specific combination of hardware and software.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server 992 transmits program code for a particular application, requested by a message sent from computer 900, through Internet 990, ISP equipment 984, local network 980 and communications interface 970. The received code may be executed by processor 902 as it is received, or may be stored in storage device 908 or other non-volatile storage for later execution, or both. In this manner, computer system 900 may obtain application program code in the form of a signal on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red a carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set 1000 upon which an embodiment of the invention may be implemented. Chip set 1000 is programmed to perform one or more steps of a method described herein and includes, for instance, the processor and memory components described with respect to FIG. *9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000**, or a portion thereof, constitutes a means for performing one or more steps of a method described herein.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1005 also stores the data associated with or generated by the execution of one or more steps of the methods described herein.

FIG. 11 is a diagram of exemplary components of a mobile terminal 1100 (e.g., cell phone handset) for communications, which is capable of operating in the system of FIG. 2C, according to one embodiment. In some embodiments, mobile terminal 1101, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps as described herein. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 as described herein. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

In some embodiments, the mobile terminal 1101 includes a digital camera comprising an array of optical detectors, such as charge coupled device (CCD) array 1165. The output of the array is image data that is transferred to the MCU for further processing or storage in the memory 1151 or both. In the illustrated embodiment, the light impinges on the optical array through a lens 1163, such as a pin-hole lens or a material lens made of an optical grade glass or plastic material. In the illustrated embodiment, the mobile terminal 1101 includes a light source 1161, such as a LED to illuminate a subject for capture by the optical array, e.g., CCD 1165. The light source is powered by the battery interface and power control module 1120 and controlled by the MCU 1103 based on instructions stored or loaded into the MCU 1103.

4. Alternatives, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

What is claimed is:

1. A vehicle node, comprising:
   a positioning sensor configured to measure a location of the vehicle node;
   an antenna configured to transmit and receive signals from other vehicle nodes of a platoon within a communication range of the vehicle node;
   a mobility component configured to facilitate movement of the vehicle node;
   a support to couple the mobility component with the positioning sensor and the antenna;
   at least one processor; and
   at least one memory including one or more sequences of instructions,
   the at least one memory and the one or more sequences of instructions configured to, with the at least one processor, cause the vehicle node to perform at least the steps of
   a) receiving directly from a second vehicle node, at the antenna, first data that indicates a value of a location at a first time increment of the second vehicle node within the platoon traveling along the path;
   b) determining, with the processor, a value of a first parameter based on the first data and a measured location of the vehicle node at the first time increment from the positioning sensor;
   c) receiving directly from a second vehicle node, at the antenna, second data that indicates a value of the location of the second vehicle node at a second time increment after the first time increment;
   d) determining, with the processor, a value of a second parameter based on the second data and a measured location of the vehicle node at the second time increment from the positioning sensor;
   e) determining, with the processor, a value of a third parameter based on the value of the first parameter and the value of the second parameter received directly from the second vehicle node;
   f) comparing, with the processor, the value of the third parameter with a threshold value for the third parameter; and
   g) controlling, with the mobility component, a value of a speed of the vehicle node based on the comparing step;
   wherein the value of the first parameter is an inverse of a value of a gap between the vehicle node and the second vehicle node at the first time increment;
   wherein the value of the second parameter is an inverse of a value of a gap between the vehicle node and the second vehicle node at the second time increment; and
   wherein the value of the gap is based on a difference between the measured value of the position of the vehicle node and the value of the position of the second vehicle node.

2. The vehicle node as recited in claim 1, wherein the at least one memory and the one or more sequences of instructions are further configured to, with the at least one processor, cause the vehicle node to further perform at least the steps of:

determining, with the processor, a value of a speed of the second vehicle node between the first time increment and the second time increment, based on the first data and the second data;

wherein step g) comprises controlling the value of the speed of the vehicle node based on the value of the speed of the second vehicle node.

3. The vehicle node as recited in claim 1, wherein step g) comprises increasing, with the mobility component, the value of the speed of the vehicle node above the value of the speed of the second vehicle node based on the comparing step indicating that the value of the third parameter is less than the value of the threshold value of the third parameter.

4. The vehicle node as recited in claim 2, wherein step g) comprises decreasing the value of the speed of the vehicle node below the value of the speed of the second vehicle node based on the comparing step indicating that the value of the third parameter is greater than the value of the threshold value of the third parameter.

5. The vehicle node as recited in claim 2, wherein the receiving steps a) and c) each comprise receiving, at the vehicle node, a message at each time increment from the second vehicle node, said message having a plurality of data fields comprising a first data field that indicates the value of the position of the second vehicle node at each time increment, a second data field that indicates an identifier of the platoon and a third data field that indicates a role of the second vehicle node within the platoon having the identifier in the second field.

6. The vehicle node as recited in claim 1, wherein the at least one memory and the one or more sequences of instructions are further configured to, with the at least one processor, cause the vehicle node to further perform at least the step of storing, in a data structure, a plurality of data fields with data pertaining to the vehicle node including a first data field to store an identifier of a platoon that includes the vehicle node and a second data field to store a role of the vehicle node within the platoon having the identifier in the first field, wherein the stored role in the second data field is a joining member role.

* * * * *